(12) United States Patent
Okamura

(10) Patent No.: US 11,870,964 B2
(45) Date of Patent: Jan. 9, 2024

(54) INFORMATION PROCESSING SYSTEM, INFORMATION PROCESSING METHOD, AND INFORMATION PROCESSING APPARATUS

(71) Applicant: Takao Okamura, Tokyo (JP)

(72) Inventor: Takao Okamura, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/063,295

(22) Filed: Dec. 8, 2022

(65) Prior Publication Data

US 2023/0216974 A1 Jul. 6, 2023

(30) Foreign Application Priority Data

Jan. 6, 2022 (JP) ................................. 2022-001009

(51) Int. Cl.
*H04N 1/32* (2006.01)
*H04N 1/00* (2006.01)

(52) U.S. Cl.
CPC ..... *H04N 1/32144* (2013.01); *H04N 1/00803* (2013.01)

(58) Field of Classification Search
CPC ........................ H04N 1/32144; H04N 1/00803
See application file for complete search history.

(56) References Cited

U.S. PATENT DOCUMENTS

2015/0193417 A1 7/2015 Yamamoto
2019/0109962 A1* 4/2019 Okamura ........... H04N 1/32149

FOREIGN PATENT DOCUMENTS

| JP | 8-183221 | 7/1996 |
| JP | 2015-130010 | 7/2015 |
| JP | 2019-071055 | 5/2019 |

\* cited by examiner

*Primary Examiner* — King Y Poon
*Assistant Examiner* — Michael L Burleson
(74) *Attorney, Agent, or Firm* — IPUSA, PLLC

(57) ABSTRACT

An information processing system includes an image processing apparatus including first circuitry and an information processing apparatus including second circuitry The first circuitry of the image processing apparatus reads an application form with a scanner to generate image data, acquires electronic watermark data from the image data, acquires, from an integrated circuit card, first identification information of the integrated circuit card, and creates application data based on the application form. The second circuitry of the information processing apparatus communicates with the image processing apparatus via a network, and performs user authentication based on the first identification information of the integrated circuit card acquired from the integrated circuit card and second identification information of the integrated circuit card previously associated with identification information of the application form. The first circuitry of the image processing apparatus stops creating the application data when the user authentication fails.

13 Claims, 43 Drawing Sheets

FIG. 11

| ACCESS LOCATION | : | https//abcde.co.jp |
| --- | --- | --- |
| ACCESS AUTHENTICATION INFORMATION | : | USER ID:ABC/PASSWORD:0000 |
| APPLICATION ID | : | 1234abcd |
| FORMAT ID | : | I0001 |
| START PROGRAM ID | : | P0001 |

FIG. 12A

| FORMAT ID | FORMAT TYPE | FORMAT DATA |
|---|---|---|
| I0001 | INPUT | I0001.format |
| I0002 | INPUT | I0002.format |

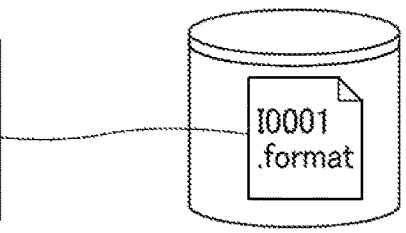

FIG. 12B

| APPLICATION ID | APPLICATION STATUS | PREVIOUS APPLICATION ID | APPLICATION STATUS |
|---|---|---|---|
| 1234abcd | NOT RECEIVED | | NOT RECEIVED |
| 00000002 | APPROVED | | APPROVED |
| 00000003 | INVALID | | INVALID |

FIG. 12C

| IC CARD ID | NAME | ADDRESS | SEX |
|---|---|---|---|
| 987654321 | TARO TANAKA | TOKYO | MALE |
| 120003459 | HANAKO SUZUKI | KYOTO | FEMALE |

FIG. 12D

| PROGRAM ID | PROGRAM DATA | PROGRAM NAME |
|---|---|---|
| p001 | p001.exe | APPLICATION FORM OUTPUT |
| p002 | p002.exe | APPLICATION DATA OUTPUT |

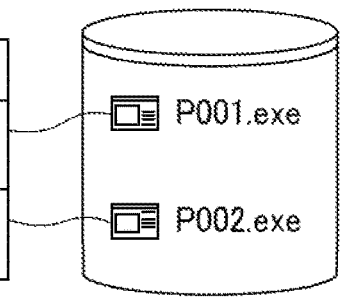

FIG. 12E

| MFP-SPECIFIC ID |
|---|
| 123456789 |

FIG. 13A

| FORMAT ID | FORMAT TYPE | FORMAT DATA |
|---|---|---|
| I0001 | INPUT | I0001.format |
| I0002 | INPUT | I0002.format |
| ⋮ | | |

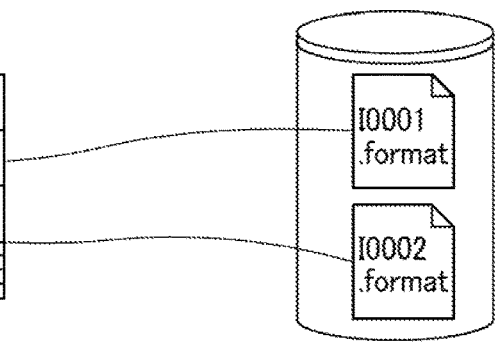

FIG. 13B

| PROGRAM ID | PROGRAM DATA | PROGRAM NAME |
|---|---|---|
| p001 | p001.exe | APPLICATION FORM OUTPUT |
| p002 | p002.exe | APPLICATION DATA OUTPUT |
| ⋮ | | |

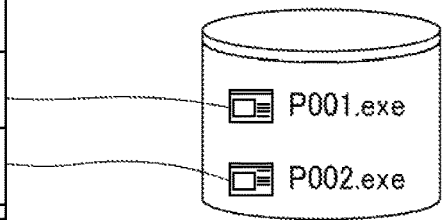

FIG. 13C

| APPLI-CATION ID | APPLI-CATION STATUS | PREVIOUS APPLI-CATION ID | MFP-SPECIFIC ID | IC CARD-SPECIFIC ID | APPLICATION DATA |
|---|---|---|---|---|---|
| 1234abcd | NOT RECEIVED | | | | 1234abcd.pdf |
| 00000002 | APPROVED | | 430980823 | wefdgadf | 00000002.pdf |
| 00000003 | INVALID | | | | |
| 00000004 | IN PROCESS | 00000003 | 42908319 | | 00000004.pdf |
| ⋮ | | | | | |

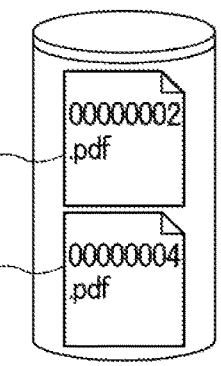

FIG. 13D

| IC CARD ID | NAME | ADDRESS | SEX |
|---|---|---|---|
| 987654321 | TARO TANAKA | TOKYO | MALE |
| 120003459 | HANAKO SUZUKI | KYOTO | FEMALE |
| ⋮ | | | |

FIG. 13E

| IC CARD ID | APPLICATION ID | IC PASSWORD |
|---|---|---|
| 987654321 | 1234abcd | 9516 |
| 120003459 | 00000001 | 0534powd |
| ⋮ | ⋮ | ⋮ |

FIG. 13F

| USER ID | PASSWORD |
|---|---|
| ABC | 0000 |
| CDE | 1111 |
| ⋮ | ⋮ |

FIG. 14

| IC CARD ID | : | 987654321 |
|---|---|---|
| PERSONAL INFORMATION | : | TARO TANAKA, TOKYO, MALE |
| IC CARD-SPECIFIC ID | : | okmijnuhbygygv |

FIG. 15

| APPLICATION INPUT FORMAT | |
|---|---|
| FAMILY NAME | GIVEN NAME |
| 0001 | 0002 |
| ADDRESS | |
| 0003 | |
| BIRTH YEAR | BIRTH MONTH AND DAY |
| 0005 | 0006 |

FIG. 16

| CODE | ITEM NAME | RELEVANT CODE |
|---|---|---|
| 0001 | FAMILY NAME | 0002 |
| 0002 | GIVEN NAME | 0001 |
| 0003 | ADDRESS | |
| 0004 | SEX | |
| 0005 | BIRTH YEAR | 0006 |
| 0006 | BIRTH MONTH AND DAY | 0005 |
| 0007 | DOMICILE OF ORIGIN | 0003 |
| 0008 | FORMAT ID | |
| 0009 | PROGRAM ID | |
| 0010 | APPLICATION ID | |
| 0011 | ACCESS LOCATION | |
| 0012 | USER ID | 0013 |
| 0013 | PASSWORD | 0012 |
| 0014 | IC PASSWORD | ffffd |
| ffffd | IC CARD ID | 0014 |
| ffffe | IC CARD-SPECIFIC ID | ffffd |
| fffff | MFP-SPECIFIC ID | |
| ⋮ | ⋮ | ⋮ |

FIG. 17A

| CODE 0003 | ADDRESS |
| --- | --- |
| | HOKKAIDO |
| | AOMORI |
| | YAMAGATA |
| | MIYAGI |
| | FUKUSHIMA |
| | NAGANO |
| | SAITAMA |
| | CHIBA |
| | NIIGATA |
| | TOCHIGI |

FIG. 17B

| APPLICATION OUTPUT FORMAT | |
| --- | --- |
| FAMILY NAME | GIVEN NAME |
| 0001 | 0002 |
| ADDRESS | |
| 0003 | |
| BIRTH YEAR | BIRTH MONTH AND DAY |
| 0005 | 0006 |
| MFP-SPECIFIC ID | IC CARD-SPECIFIC ID |
| ffff | fffe |

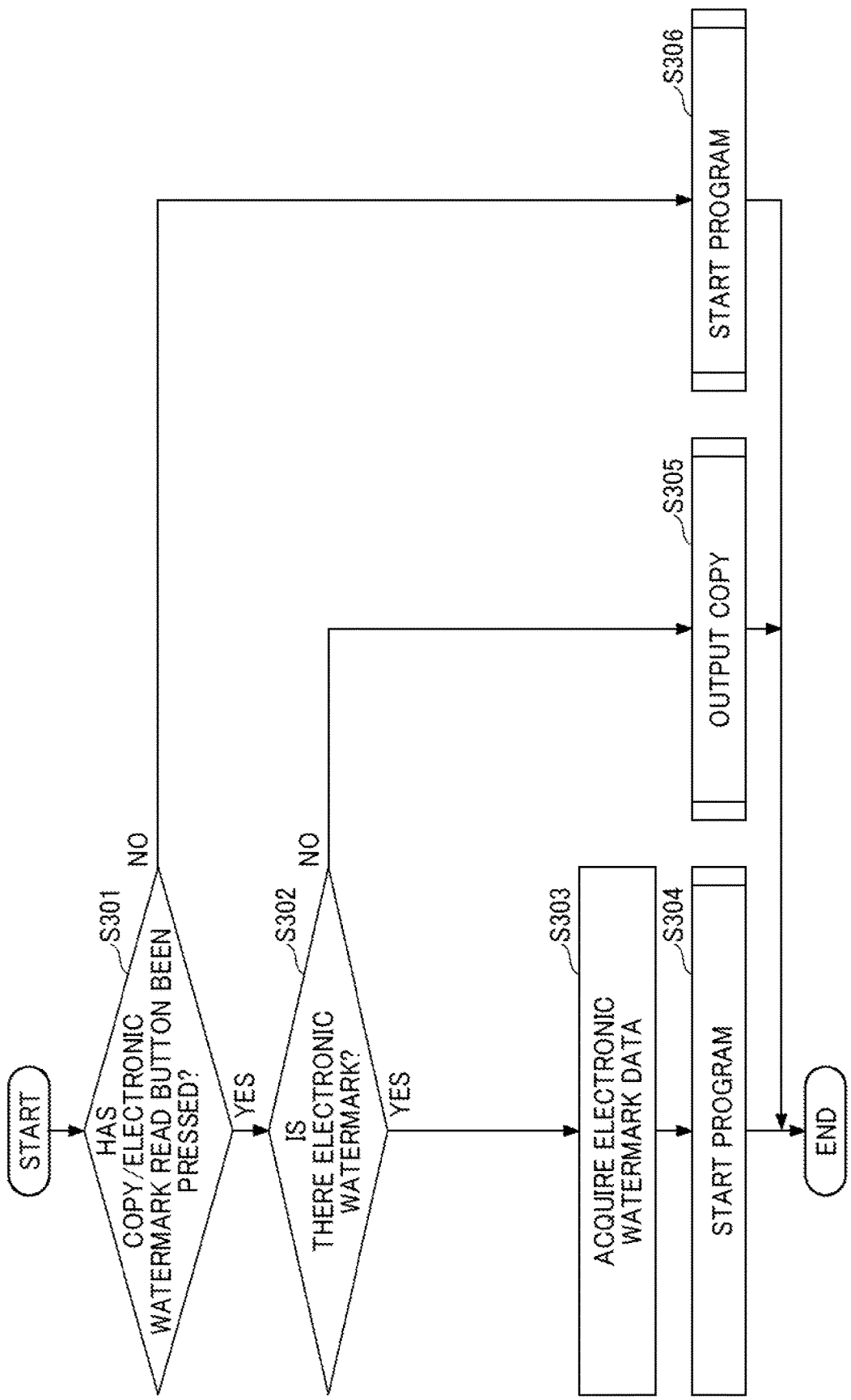

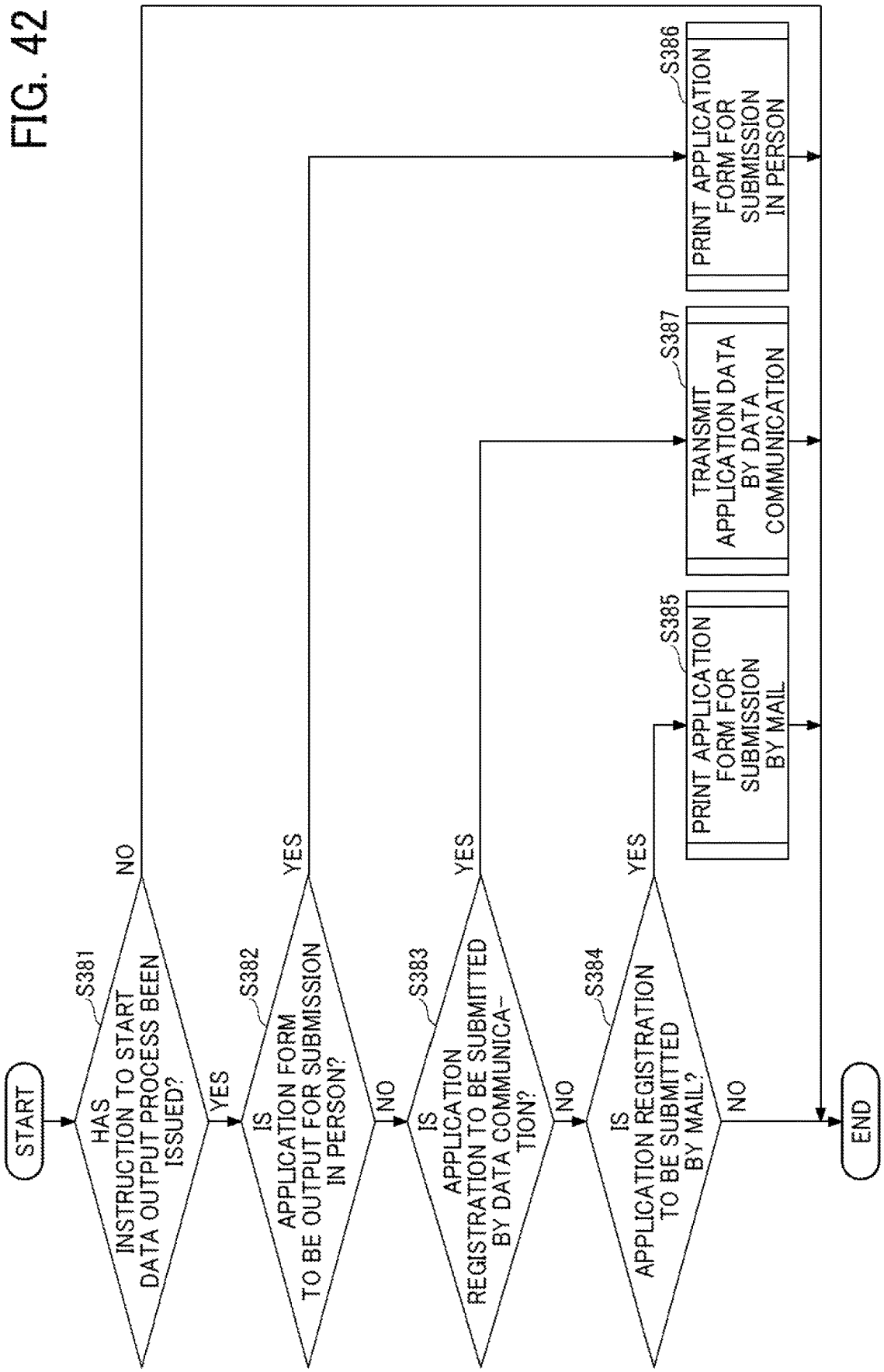

INFORMATION PROCESSING SYSTEM, INFORMATION PROCESSING METHOD, AND INFORMATION PROCESSING APPARATUS

CROSS-REFERENCE TO RELATED APPLICATION

This patent application is based on and claims priority pursuant to 35 U.S.C. § 119(a) to Japanese Patent Application No. 2022-001009, filed on Jan. 6, 2022, in the Japan Patent Office, the entire disclosure of which is hereby incorporated by reference herein.

BACKGROUND

Technical Field

Embodiments of this disclosure relate to an information processing system, an information processing method, and an information processing apparatus.

Related Art

When an application form (e.g., a pension benefit application document) arrives from a local government such as a city or ward, an applicant fills out and returns the application form by mail or in person.

There is a technology supporting such application work. For example, there is a technology of reflecting registered personal information in the format of a document and printing the document with the reflected personal information.

If the application form falls into the hands of a third party, however, the above-described technology has a risk of impersonation by the third party. For example, the third party may change the address of the obtained application form to the address of the third party to change the mailing address of the recipient of what is applied for (e.g., pension benefit) to the address of the third party.

SUMMARY

In one embodiment of this invention, there is provided an information processing system that includes, for example, an image processing apparatus and an information processing apparatus. The image processing apparatus includes first circuitry. The information processing apparatus includes second circuitry. The first circuitry of the image processing apparatus reads an application form with a scanner to generate image data, acquires electronic watermark data from the image data, acquires, from an integrated circuit card, first identification information of the integrated circuit card, and creates application data based on the application form. The second circuitry of the information processing apparatus communicates with the image processing apparatus via a network, and performs user authentication based on the first identification information of the integrated circuit card acquired from the integrated circuit card and second identification information of the integrated circuit card previously associated with identification information of the application form. The first circuitry of the image processing apparatus stops creating the application data when the user authentication fails.

In one embodiment of this invention, there is provided an information processing method that includes, for example, reading an application form with a scanner to generate image data, acquiring electronic watermark data from the image data, acquiring, from an integrated circuit card, first identification information of the integrated circuit card, creating application data based on the application form, performing user authentication based on the acquired first identification information of the integrated circuit card and second identification information of the integrated circuit card previously associated with identification information of the application form, and stopping creating the application data when the user authentication fails.

In one embodiment of this invention, there is provided an information processing apparatus that includes, for example, circuitry that receives first identification information of an integrated circuit card, and receives identification information of an application form from an image processing apparatus that creates application data based on the application form via a network. The identification information of the application form is included in electronic watermark data of image data read from the application form. The circuitry further performs user authentication based on the received first identification information of the integrated circuit card and second identification information of the integrated circuit card. The second identification information of the integrated circuit card is previously associated with the identification information of the application form. The circuitry further transmits a result of the user authentication to the image processing apparatus to cause the image processing apparatus to stop creating the application data when the result of the user authentication indicates failed user authentication.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 11 is a schematic diagram illustrating content of electronic watermark data of the embodiment;

FIGS. 12A, 12B, 12C, 12D, and 12E are schematic diagrams illustrating data stored in the image processing apparatus of the embodiment;

FIGS. 13A, 13B, 13C, 13D, 13E, and 13F are diagrams illustrating data structures of data stored in the external storage apparatus of the embodiment:

FIG. 14 is a diagram illustrating a data structure of the IC card of the embodiment;

FIG. 15 is a diagram illustrating exemplary format data of an application form of the embodiment;

FIG. 16 is a diagram illustrating an exemplary code table for the format data of the embodiment:

FIG. 17A is a diagram illustrating an example of options displayed on the image processing apparatus of the embodiment:

FIG. 17B is a diagram illustrating an example of an output format displayed on the image processing apparatus of the embodiment;

FIG. 35 is a flowchart illustrating an exemplary overview of a process of the image processing apparatus of the embodiment;

FIG. 42 is a flowchart illustrating an exemplary data output process of the image processing apparatus of the embodiment.

Figure 1:
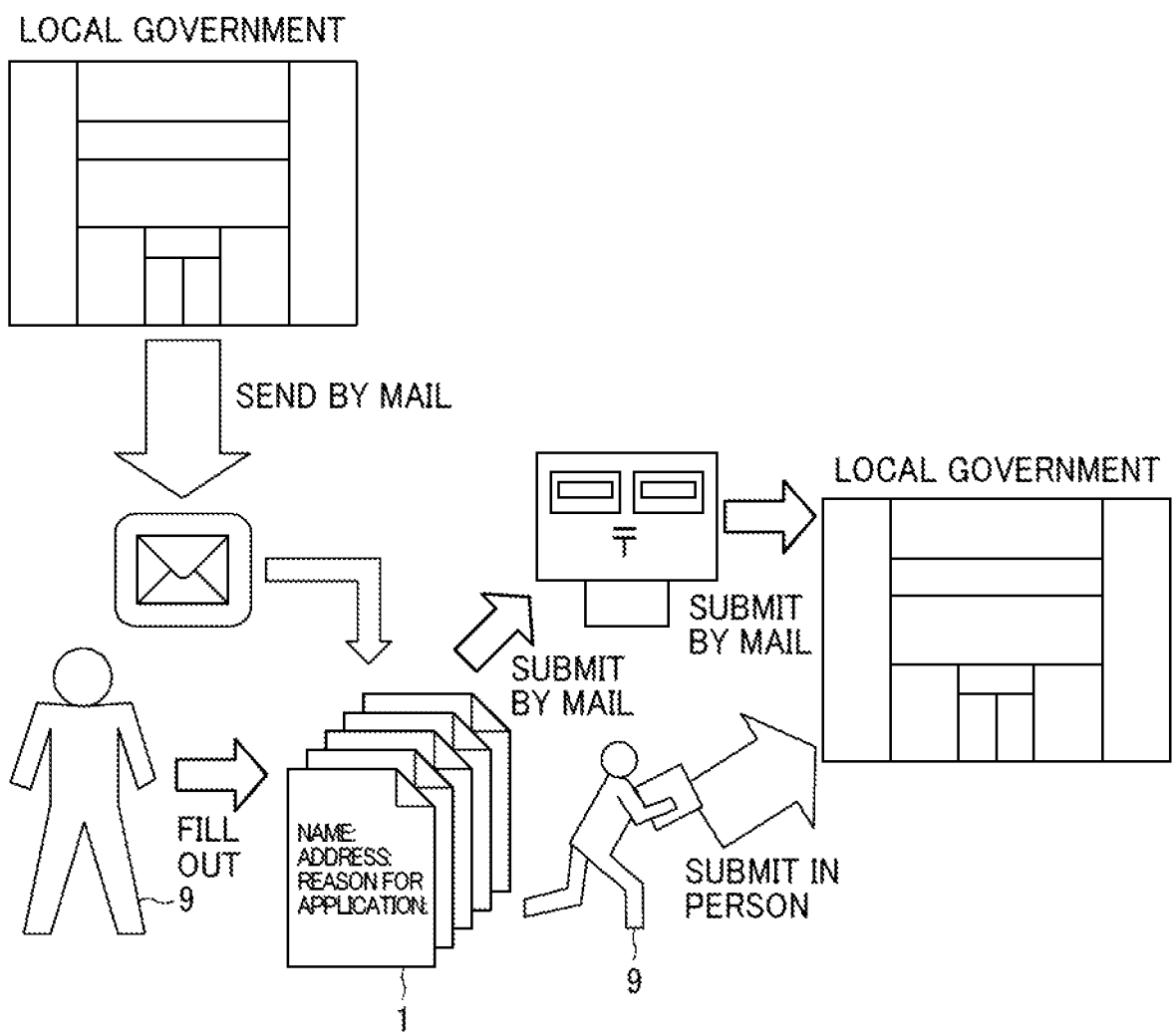
FIG. 1 is a diagram illustrating an example of a related-art application method.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, an application system (an information processing system) and an application method (an information processing method) performed thereby are described below as exemplary embodiments of the present disclosure. As used herein, the singular forms "a," "an," and "the" are intended to include the plural forms as well, unless the context clearly indicates otherwise.

Prior to the description of the embodiments, an overview of a related-art application method will be described.

FIG. 1 is a diagram illustrating an example of a related-art application method. According to the related-art application method, when an applicant 9 submits an application form 1 to a local government, for example, the applicant 9 fills out input fields of the application form 1 and submits the application form 1 by mail or in person. Specifically, the local government first sends the application form 1 by mail to the applicant 9, and the applicant 9 fills out the input fields of the application form 1 and submits the application form 1 to the local government by mail or in person.

If the application form 1 is a pension benefit application document, for example, the applicant 9 is typically asked to fill out the same input fields by hand in accordance with the same application form format every time the applicant 9 applies for pension benefit, even when there is no change in the information to provide on the application form 1 (e.g., no change in the address). Further, if the application form 1 falls into the hands of a third party, there is a risk of impersonation by the third party; the third party may submit the application form 1 by using the address thereof. This issue will be explained below with reference to FIG. 2.

Figure 2:
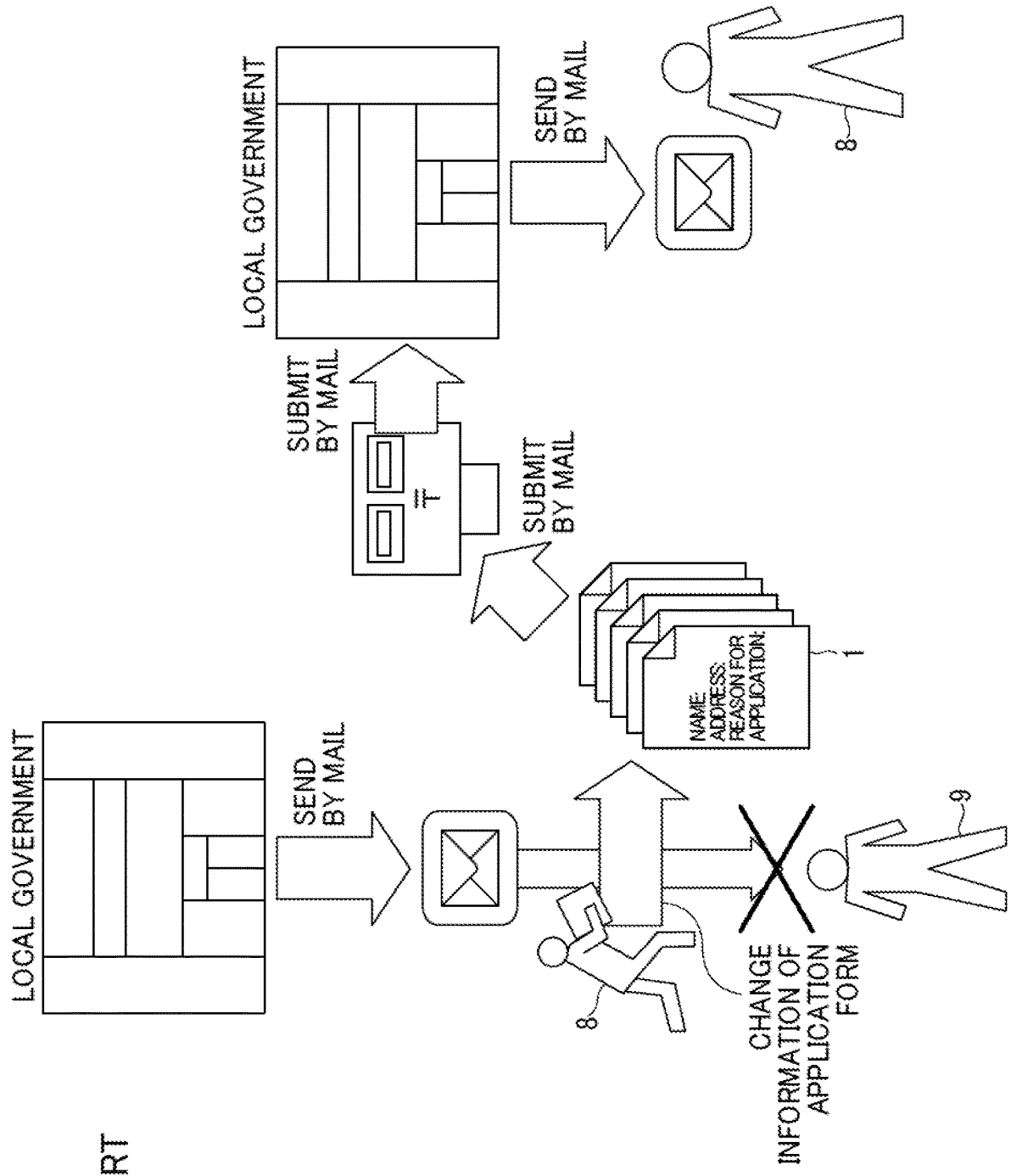
FIG. 2 is a diagram illustrating an issue of the related-art application method.

FIG. 2 is a diagram illustrating the issue of the related-art application method. For example, the application form 1 supposed to be sent by mail to the applicant 9 falls into the hands of a third party 8. The third party 8 changes the address of the application form 1, for example, to impersonate the applicant 9. The third party 8 then submits the application form 1 to the local government by mail or in person. Consequently, the application form 1 forged by the third party 8 is accepted by the local government; impersonation takes place.

In view of the above-described issue, an application method according to an embodiment of the present invention uses an application form embedded with an electronic watermark (i.e., digital watermark). According to the application method of the embodiment, the applicant 9 causes an image processing apparatus to read the application form 1 embedded with the electronic watermark. The image processing apparatus detects the electronic watermark and starts a program identified by the electronic watermark. The image processing apparatus then acquires, from the Internet, for example, the data of the input fields of the application form 1 based on an application identifier (ID) identified by the electronic watermark, and prompts the applicant 9 to fill out the input fields. This application method using the electronic watermark will be explained with FIG. 3.

Figure 3:
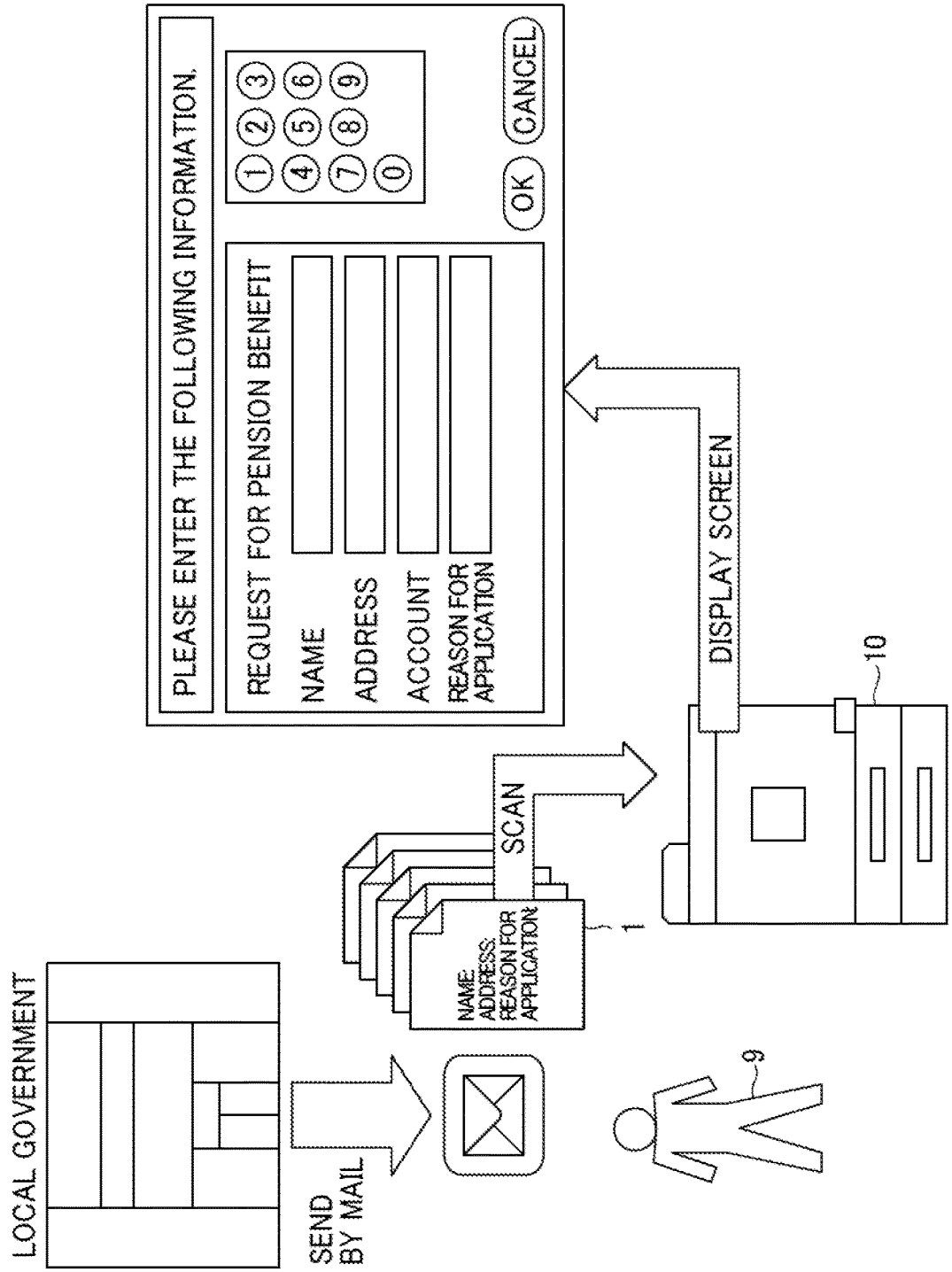
FIG. 3 is a diagram illustrating an overview of an application method using an electronic watermark according to an embodiment of the present invention.

FIG. 3 is a diagram illustrating an overview of the application method of the embodiment using the electronic watermark. The local government sends the applicant 9 by mail the application form 1 embedded with the electronic watermark, and the applicant 9 causes an image processing apparatus 10 to read the application form 1. The mailing address (i.e., the address of the applicant 9) and the format of application data are embedded in the application form 1 in the form of an electronic watermark. The image processing apparatus 10 displays the input fields of the application form 1, and the applicant 9 inputs information such as the address in the input fields via a touch panel of the image processing apparatus 10, for example.

Figure 4:
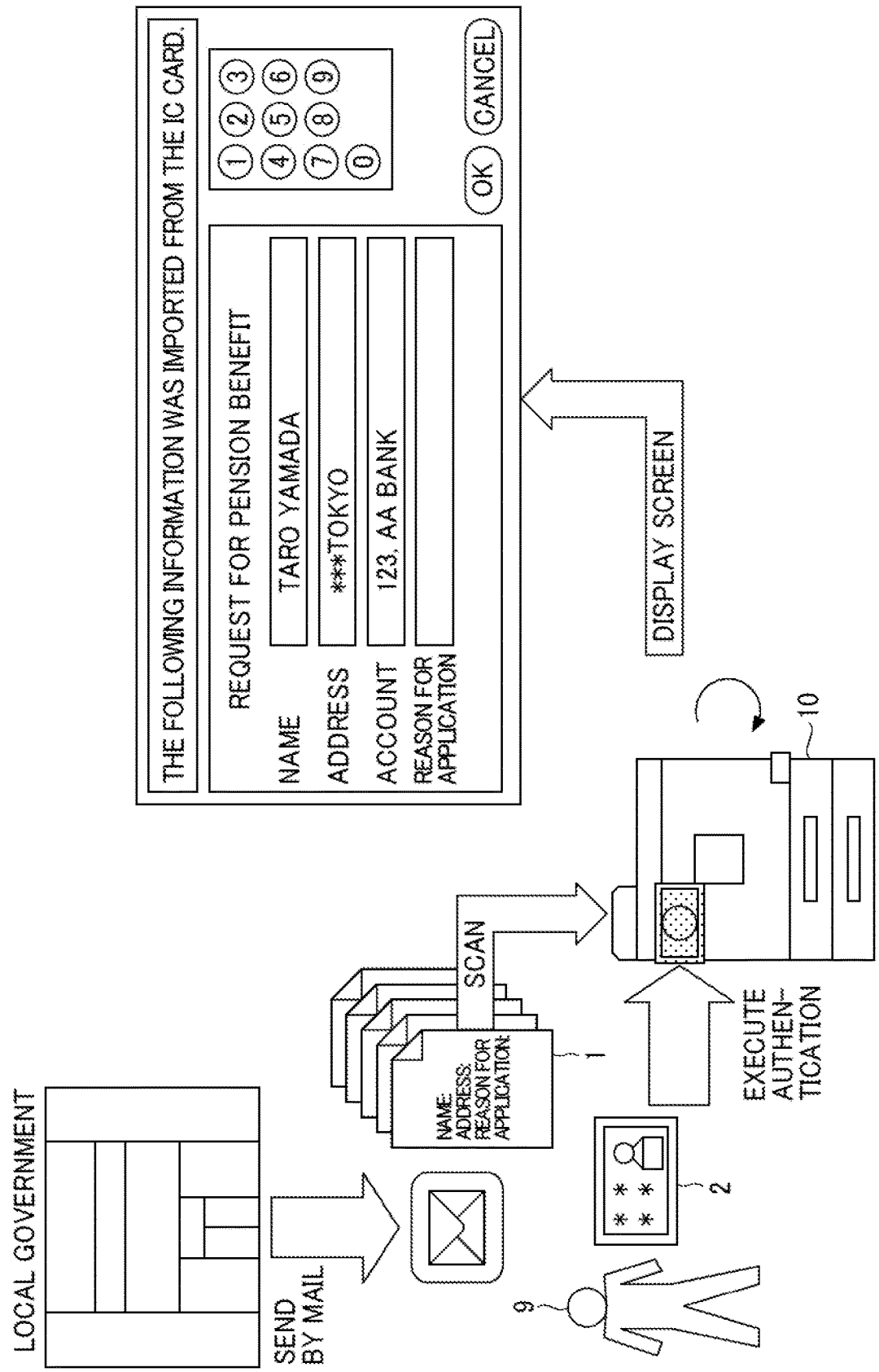
FIG. 4 is a diagram illustrating an overview of an application method using the electronic watermark and an integrated circuit (IC) card of the embodiment.

Alternatively, the applicant 9 may use an integrated circuit (IC) card to reduce the input work. FIG. 4 is a diagram illustrating an overview of an application method of the embodiment using the electronic watermark and the IC card. In the example of FIG. 4, the image processing apparatus 10 is equipped with an IC card reader. The local government sends the applicant 9 by mail the application form 1 embedded with the electronic watermark, and the applicant 9 causes the image processing apparatus 10 to read the application form 1. The applicant 9 further causes the IC card reader to read an IC card 2. In the present example, the IC card 2 is a My Number card storing personal information of the applicant 9. The image processing apparatus 10 then obtains personal information of an IC card holder associated with the IC card 2. A My Number card, in Japan, is an IC-chip embedded plastic card that shows name, address, date of birth, sex, My Number (individual number), of an individual, along with a photo of the individual. The My Number card can be used as an official ID card. In alternative to the My Number card, any ID card may be used, such as a driver's license, for authentication of the individual.

Based on the electronic watermark, the image processing apparatus 10 acquires the input fields of the application form 1 from a memory of the image processing apparatus 10 or from the Internet, and displays the input fields on an operation panel of the image processing apparatus 10. For example, the mailing address and application form format data are embedded in the application form 1 in the form of an electronic watermark. The image processing apparatus 10 detects the electronic watermark. Then, based on the electronic watermark, the image processing apparatus 10 acquires, from the Internet, information items the same as or similar to those of the application form 1. The image processing apparatus 10 further acquires the mailing address based on the electronic watermark.

The image processing apparatus 10 then acquires the address from the IC card 2 or the Internet as information associated with the My Number card, and compares the thus-acquired address with the address acquired based on the electronic watermark of the application form 1. If the two addresses match, the image processing apparatus 10 determines that the operator of the image processing apparatus 10 is identical with the applicant 9 associated with the mailing address; the image processing apparatus 10 determines successful authentication of the applicant 9. This determination may be made by a later-described external storage apparatus (an example of an information processing apparatus).

Then, the image processing apparatus 10 enters the address associated with the My Number card or the address acquired based on the electronic watermark in the corresponding input field.

As described above, the application method of the present embodiment saves the applicant 9 from typing or writing by hand the same personal information in each application. Further, the application method of the present embodiment uses the IC card 2 and the electronic watermark for the authentication of an individual, promoting the prevention of impersonation by a third party.

In the above-described case, the applicant 9 may print the application form 1 without filling out the input fields (i.e., without inputting any information in the input fields). This is because since the authentication of an individual is executed with the IC card 2 and the electronic watermark, the application with the application form 1 returned to the local government by mail or with the application data transmitted to the local government via a network is considered to be the application by the individual with no change in the information of the application form 1.

Information held by the electronic watermark and information held by the IC card 2 will be described in more detail with reference to FIG. 5.

Figure 5:
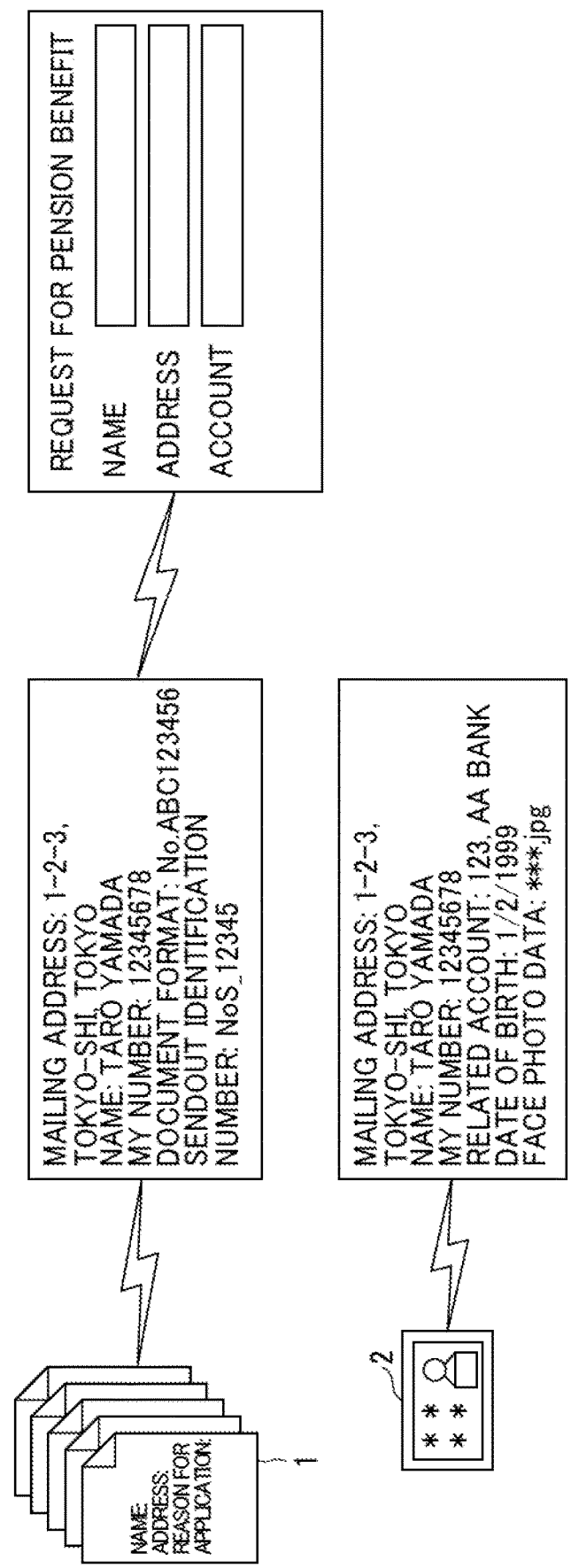
FIG. 5 is a diagram illustrating an example of information held by the electronic watermark and information held by the IC card of the embodiment.

FIG. 5 is a diagram illustrating an example of the information held by the electronic watermark and the information held by the IC card 2. The electronic watermark of the application form 1 is embedded with information related to the applicant 9 such as the mailing address and a document format of the application form 1, for example. Such information is read by the image processing apparatus 10 to display the input fields (i.e., input items) of the application form 1 on the operation panel (an example of a display).

The IC card 2 holds various personal information or information associated with the personal information. When filling out the application form 1, the image processing apparatus 10 may acquire the personal information from the IC card 2 and enter the thus-acquired personal information in the input fields.

Definitions of terms used in the present specification will be described.

The term "impersonation" refers to an act of a person impersonating another person to use a system or communicate with a third party.

The term "electronic watermark" refers to normally invisible information arranged on a surface of a sheet and extractable by detection software. For instance, a surface of a sheet is divided into a grid of cells, and information is embedded based on which ones of the cells contain a dot, for example. There are various electronic watermarking techniques, and the present embodiment is not limited to a particular electronic watermarking technique.

The term "application form" refers to a document submitted to file a request or request permission, for example. The application form may also be called the application document or application paper, for example.

The term "application data" refers to information items written on the application form by hand or information items input by a user or automatically input by the image processing apparatus 10.

Although a two-dimensional code or bar code may be arranged on the sheet along with or separately from the electronic watermark, the two-dimensional code or bar code is visible and thus susceptible to forgery.

The term "IC card" refers to a card-type recording medium with an IC incorporated therein to record information or perform arithmetic operations, for example. The IC card may be built in a smartphone or a mobile phone, for example.

An example of the system configuration of an application system of the present embodiment will be described.

Figure 6:
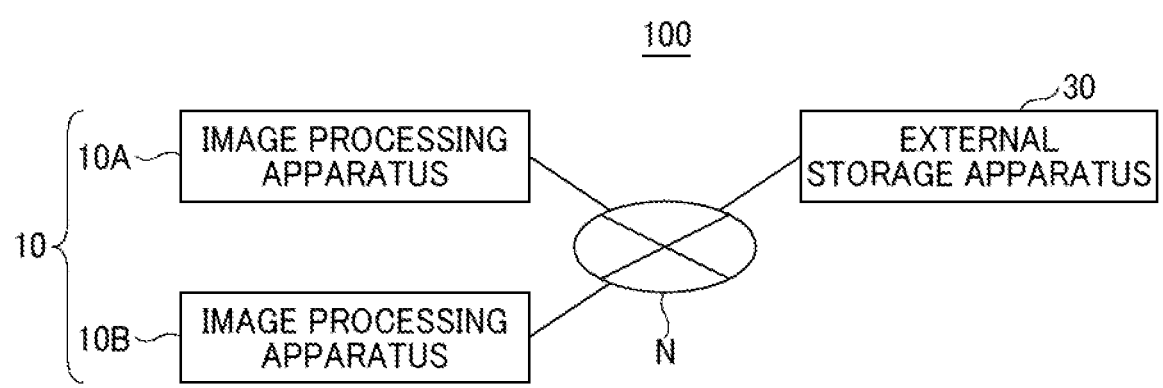
FIG. 6 is a diagram illustrating an exemplary schematic configuration of an application system of the embodiment.

FIG. 6 is a diagram illustrating an exemplary schematic configuration of an application system 100 of the present embodiment. The application system 100 includes an image processing apparatus 10A, an image processing apparatus 10B, and an external storage apparatus 30, which are communicable with each other via a network N.

The image processing apparatus 10A is an image processing apparatus 10 installed in a facility that receives the submitted application form 1. The image processing apparatus 10B is an image processing apparatus 10 installed in a local government office, for example. The facility in this case is a facility of a local government or educational organization receiving the application form 1, for example, and is not limited to a particular facility.

The image processing apparatus 10 is an apparatus or equipment with at least a scanner function. For example, the image processing apparatus 10 is an apparatus called multifunction peripheral (MFP). The MFP is an apparatus or equipment with multiple functions such as a printer function, a copier function, and a facsimile (FAX) function as well as the scanner function. The MFP may also be called the copier or copy machine. The image processing apparatus 10 may be a computer with an external scanner attached thereto, or may be a computer that acquires image data of an image captured by a digital camera. A smartphone may also function as the image processing apparatus 10. The image processing apparatus 10 may include a touch panel that receives information related to the application form 1.

The image processing apparatus 10A is an image processing apparatus 10 used by the applicant 9. The image processing apparatus 10B is an image processing apparatus 10 used by personnel of the local government in charge of processing applications (hereinafter simply referred to as the application personnel), for example. Hereinafter, the image processing apparatus 10A or the image processing apparatus 10B will be simply referred to as the image processing apparatus 10 where the distinction therebetween is unnecessary.

The external storage apparatus 30 is implemented by one or more information processing apparatuses. Specifically, the external storage apparatus 30 may be a personal computer (PC), a server apparatus, or a workstation, for example. The external storage apparatus 30 stores the respective input formats of various application forms. The external storage apparatus 30 may be included in the image processing apparatus 10. Further, the external storage apparatus 30 may be located in an on-premise environment or a cloud environment.

A description will be given of exemplary hardware configurations of the image processing apparatus 10 and the external storage apparatus 30.

Figure 7:
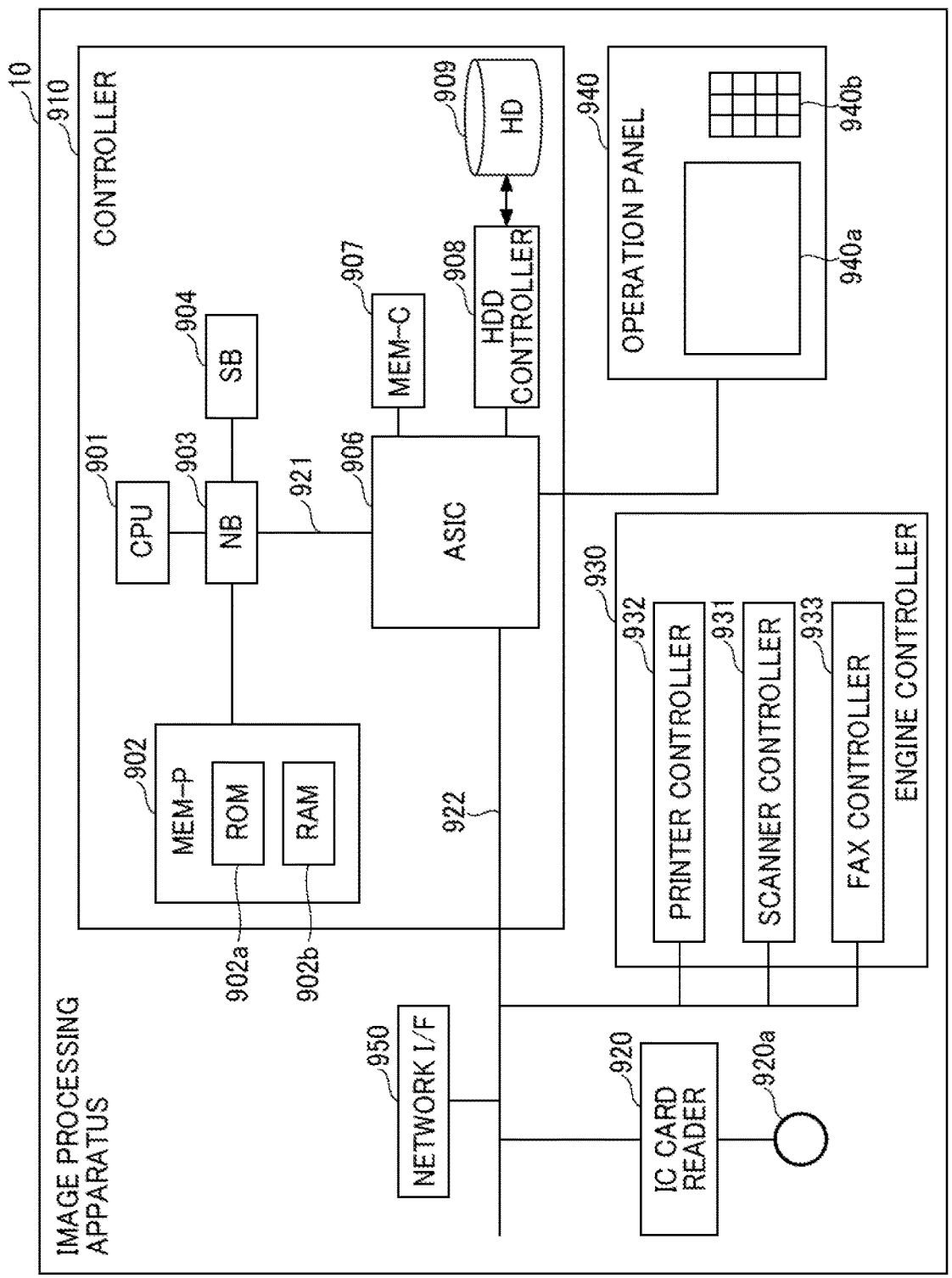
FIG. 7 is a diagram illustrating an exemplary hardware configuration of an image processing apparatus included in the application system of the embodiment.

FIG. 7 is a diagram illustrating an exemplary hardware configuration of the image processing apparatus 10. As illustrated in FIG. 7, the image processing apparatus 10 includes a controller 910, an IC card reader 920, an engine controller 930, an operation panel 940, and a network interface (IF) 950.

The controller 910 includes a central processing unit (CPU) 901 as a major component of a computer forming the image processing apparatus 10, a system memory (MEM-P) 902, a north bridge (NB) 903, a south bridge (SB) 904, an application specific integrated circuit (ASIC) 906, a local memory (MEM-C) 907 serving as a storage device, a hard disk drive (HDD) controller 908, and a hard disk (HD) 909 serving as a storage device. The NB 903 and the ASIC 906 are connected to each other by an accelerated graphics port (AGP) bus 921.

The CPU 901 is a control device that performs overall control of the image processing apparatus 10. The NB 903 is a bridge for connecting the CPU 901, the MEM-P 902, the SB 904, and the AGP bus 921 to each other. The NB 903 includes a memory controller that controls data writing and reading to and from the MEM-P 902, a peripheral component interconnect (PCI) master, and an AGP target.

The MEM-P 902 includes a read only memory (ROM) 902a and a random access memory (RAN) 902b. The ROM 902a is a memory for storing programs and data for implementing functions of the controller 910. The RAM 902b is used as a memory in deploying a program or data or as a rendering memory in memory printing, for example. Each of the programs stored in the ROM 902a, which may be deployed into the RAM 902b, may be provided as recorded on a computer readable recording medium, such as a compact disc-ROM (CD-ROM), a CD-recordable (CD-R), or a digital versatile disk (DVD), in an installable or executable file format.

The SB 904 is a bridge for connecting the NB 903 to a PCI device or a peripheral device. The ASIC 906, which is an IC for image processing, includes hardware components for image processing. The ASIC 906 functions as a bridge for connecting the AGP bus 921, a PCI bus 922, the HDD controller 908, and the MEM-C 907 to each other. The ASIC 906 includes a PCI target, an AGP master, an arbiter as a core component of the ASIC 906, a memory controller that controls the MEM-C 907, a plurality of direct memory access controllers (DMACs) that perform processes such as the rotation of image data with a hardware logic, and a PCI unit that transfers data to and from a scanner controller 931, a printer controller 932, or a FAX controller 933 of the engine controller 930 via the PCI bus 922. The ASIC 906 may include a universal serial bus (USB) interface and an institute of electrical and electronics engineers (IEEE) 1394 interface.

The MEM-C 907 is a local memory used as a copy image buffer and a code buffer. The HD 909 is a storage device for storing image data, font data for use in printing, and form data. The HDD controller 908 controls data writing and reading to and from the HD 909 under the control of the CPU 901. The AGP bus 921 is a bus interface for a graphics accelerator card proposed to speed up graphics processing. The AGP bus 921 enables the graphics accelerator card to directly access the MEM-P 902 with a high throughput, thereby implementing a high-speed graphics accelerator card.

The IC card reader 920 equipped with an antenna 920a is a communication circuit conforming to a standard such as near field communication (NFC) or Bluetooth*.

The engine controller 930 includes the scanner controller 931, the printer controller 932, and the FAX controller 933. The operation panel 940 includes a panel display 940a and hardware keys 940b. The panel display 940a is implemented by, for example, a touch panel that displays the current setting values and a selection screen and receives an input from the operator (i.e., user). The hardware keys 940b include numeric keys for receiving the setting values of conditions related to image formation such as a density setting condition and a start key for receiving a copy start instruction, for example. The controller 910 controls the entire image processing apparatus 10 to control rendering, communication, and input via the operation panel 940, for example. Each of the scanner controller 931, the printer controller 932, and the FAX controller 933 includes an image processing section that performs processing such as error diffusion and gamma conversion.

With an application switch key included in the operation panel 940, the function of the image processing apparatus 10 is sequentially switched to a document box function, a copier function, a printer function, and a FAX function to select a desired function. When the document box function is selected, the image processing apparatus 10 is switched to document box mode. When the copier function is selected, the image processing apparatus 10 is switched to copy mode. When the printer function is selected, the image processing apparatus 10 is switched to printer mode. When the FAX function is selected, the image processing apparatus 10 is switched to FAX mode.

The network I/F 950 is an interface for performing data communication via the network N. The network I/F 950 and the IC card reader 920 are electrically connected to the ASIC 906 via the PCI bus 922.

Figure 8:
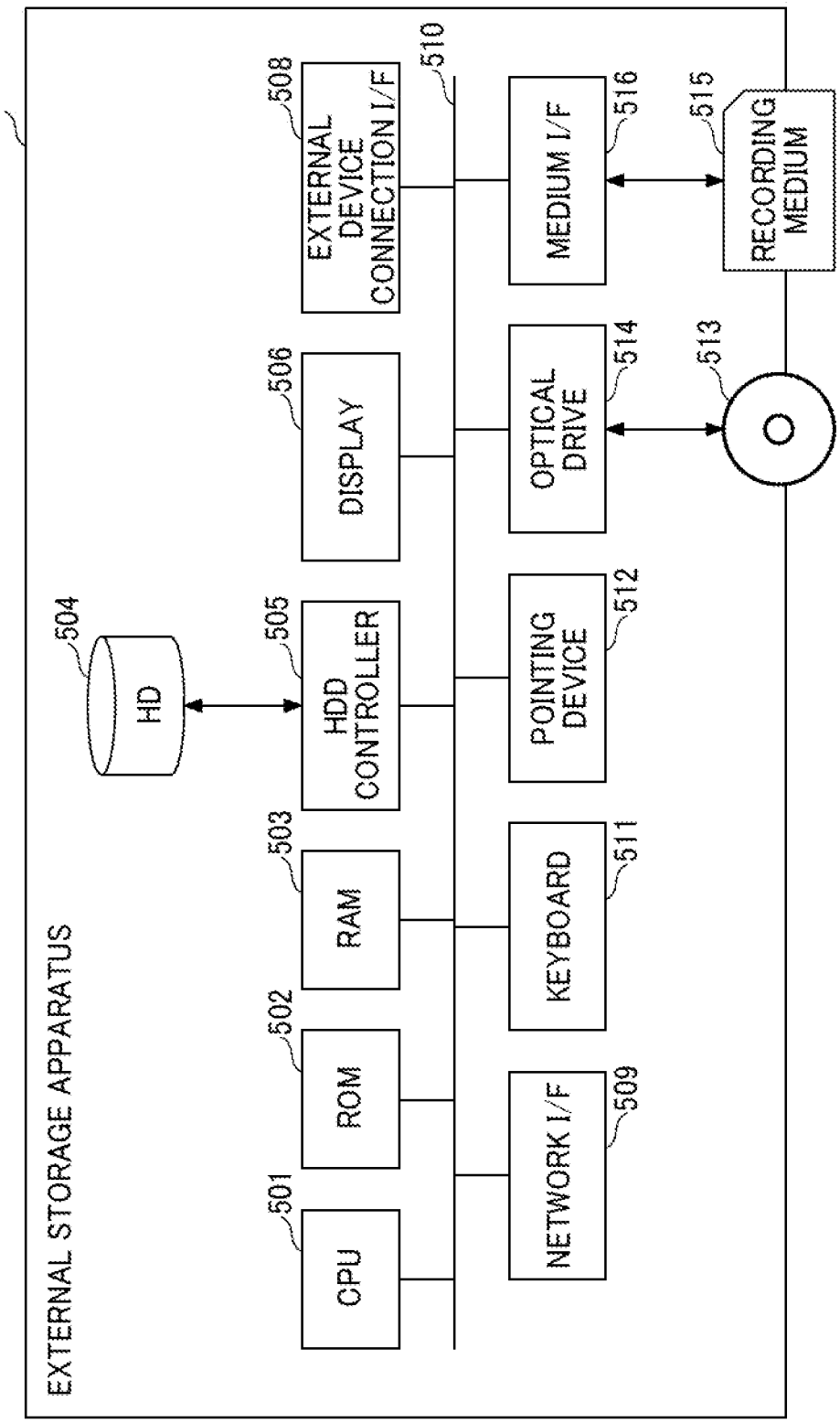
FIG. 8 is a diagram illustrating an exemplary hardware configuration of an external storage apparatus included in the application system of the embodiment.

FIG. 8 is a diagram illustrating an exemplary hardware configuration of the external storage apparatus 30. As illustrated in FIG. 8, the external storage apparatus 30 implemented by a computer includes a CPU 501, a ROM 502, a RAM 503, an HD 504, an HDD controller 505, a display 506, an external device connection I/F 508, a network I/F 509, a bus line 510, a keyboard 511, a pointing device 512, an optical drive 514, and a medium I/F 516.

The CPU 501 controls overall operation of the external storage apparatus 30. The ROM 502 stores a program used to drive the CPU 501, such as an initial program loader (IPL). The RAM 503 is used as a working area of the CPU 501. The HD 504 stores various data of programs, for example. The HDD controller 505 controls data writing and reading of various data to and from the HD 504 under the control of the CPU 501. The display 506 displays various information such as a cursor, menus, windows, text, and images. The external device connection I/F 508 is an interface for connecting various external devices to the external storage apparatus 30. The external devices in this case include a USB memory and a printer, for example. The network I/F 509 is an interface for performing data communication via the network N. The bus line 510 includes address buses and data buses for electrically connecting the CPU 501 and the other components in FIG. 8 to each other.

The keyboard 511 is an input device including a plurality of keys used to input text, numerical values, and various instructions, for example. The pointing device 512 is an input device used to select and execute various instructions, select a processing target, or move the cursor, for example. The optical drive 514 controls writing and reading of various data to and from a removable optical storage medium 513. The optical storage medium 513 may be a CD, a DVD, or a Blu-ray™ disc, for example. The medium I/F 516 controls writing (i.e., storage) and reading of data to and from a recording medium 515 such as a flash memory. A description will be given of functions of the image processing apparatus 10 and the external storage apparatus 30.

Figure 9:
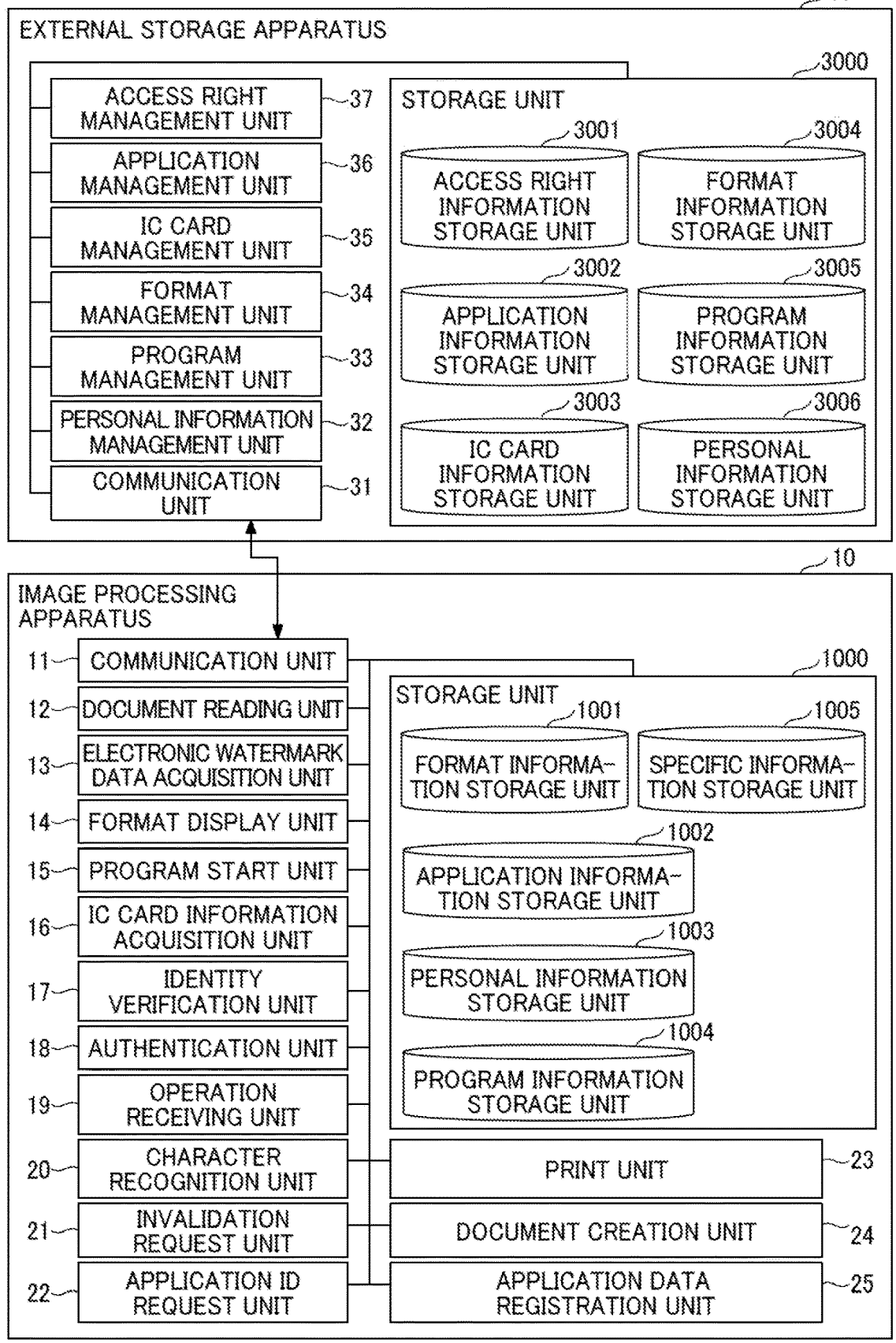
FIG. 9 is a functional block diagram illustrating exemplary functional blocks of the image processing apparatus and the external storage apparatus in the application system of the embodiment.

FIG. 9 is a functional block diagram illustrating exemplary functional blocks of the image processing apparatus 10 and the external storage apparatus 30 included in the application system 100.

The image processing apparatus 10 includes a communication unit 11, a document reading unit 12, an electronic watermark data acquisition unit 13, a format display unit 14, a program start unit 15, an IC card information acquisition unit 16, an identity verification unit 17, an authentication unit 18, an operation receiving unit 19, a character recognition unit 20, an invalidation request unit 21, an application ID request unit 22, a print unit 23, a document creation unit 24, and an application data registration unit 25. These functions of the image processing apparatus 10 are implemented by the CPU 901 executing programs stored in the HD 909 in FIG. 7 and controlling the components of the image processing apparatus 10.

The image processing apparatus 10 further includes a storage unit 1000 (an example of a memory), which is implemented by the HD 909, for example. The storage unit 1000 includes a format information storage unit 1001, an application information storage unit 1002, a personal information storage unit 1003, a program information storage unit 1004, and a specific information storage unit 1005.

The communication unit 11 (an example of a first communication unit) transmits and receives various information to and from the external storage apparatus 30.

The document reading unit 12 causes a scanner to read a document (i.e., application form 1) to generate image data of the application form 1.

The electronic watermark data acquisition unit 13 detects the electronic watermark in the image data of the application form 1. If the electronic watermark is detected, the electronic watermark data acquisition unit 13 acquires therefrom electronic watermark data.

The format display unit 14 acquires format data from the format information storage unit 1001 based on a format ID included in the electronic watermark data, and displays the acquired format data on the operation panel 940.

The program start unit 15 acquires a program from the program information storage unit 1004 based on a start program ID included in the electronic watermark data, and starts the acquired program.

The IC card information acquisition unit 16 controls the IC card reader 920 to acquire IC card information from the IC card 2.

The identity verification unit 17 executes identity verification by comparing the electronic watermark data with the IC card information or by requesting the external storage apparatus 30 to perform the comparison.

In response to receipt of input of a password set in the IC card 2, the authentication unit 18 determines whether to allow the use of information stored in the IC card 2.

The operation receiving unit 19 receives various operations performed on the image processing apparatus 10, including an operation of inputting data to reflect in the format data.

The character recognition unit 20 executes character recognition by performing an optical character recognition (OCR) process on the image data.

The invalidation request unit 21 requests the external storage apparatus 30 to invalidate the application ID included in the electronic watermark data.

The application ID request unit 22 requests the external storage apparatus 30 to assign a new application ID to the application form 1, the application ID of which is invalidated.

The print unit 23 causes a printer to print the application data on a sheet, specifically a sheet to be submitted by mail or a sheet to be submitted in person.

The document creation unit 24 identifies the format data associated with the format ID included in the electronic watermark data, and reflects the result of the OCR process in the format data to create the application data.

The application data registration unit 25 stores the application data including the personal information obtained through the character recognition in a memory included in the image processing apparatus 10 or a memory located in the network N.

Figure 10A:
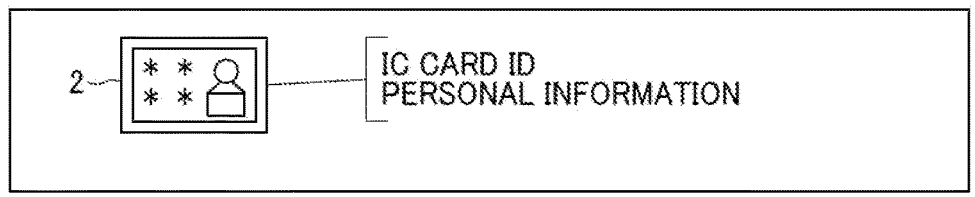
FIGS. 10A, 10B, 10C, and 10D are diagrams illustrating data structures used in the embodiment.

FIGS. 10A, 10B, 10C, and 10D are diagrams illustrating data structures used in the present embodiment. FIG. 10A illustrates data stored in the IC card 2. The IC card 2 stores an IC card ID and the personal information. The data structure of the IC card 2 will be described in more details later with FIG. 14.

Figure 10B:
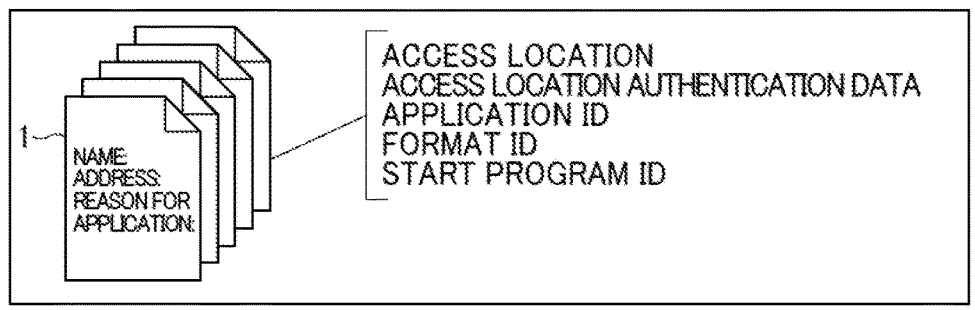

FIG. 10B illustrates the electronic watermark data embedded in the electronic watermark. The electronic watermark contains data items "access location," "access location authentication data," "application ID," "format ID," and "start program ID." The data embedded in the electronic watermark of the application form 1 will be described in more details later with FIG. 11.

Figure 10C:
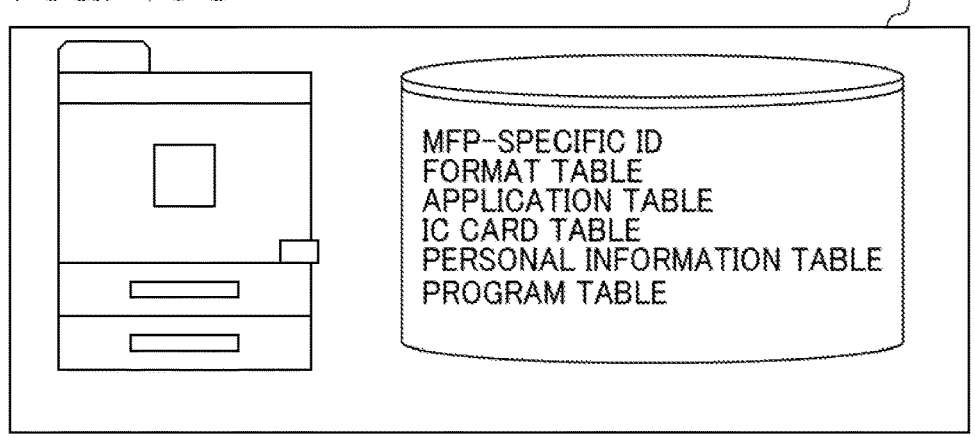

FIG. 10C illustrates data stored in the image processing apparatus 10. The image processing apparatus 10 stores an MFP-specific ID, a format table, an application table, an IC card table, a personal information table, and a program table. The data stored in the image processing apparatus 10 will be described in more details later with FIGS. 12A to 12E.

Figure 10D:
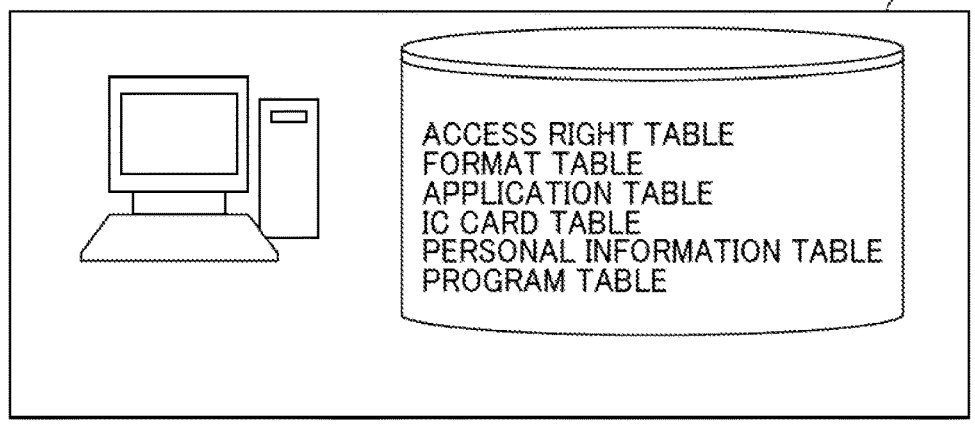

FIG. 10D illustrates data stored in the external storage apparatus 30. The external storage apparatus 30 stores an access right table, a format table, an application table, an IC card table, a personal information table, and a program table. The data stored in the external storage apparatus 30 will be described in more details later with FIGS. 13A to 13F.

FIG. 11 schematically illustrates the items of the electronic watermark data, which are acquired when the application form 1 is read by a device that detects electronic watermarks. The access location is a uniform resource locator (URL) representing the location of the external storage apparatus 30 that is accessed by the image processing apparatus 10. The access authentication information is authentication information used to access the external storage apparatus 30. The application ID is identification information for identifying the application. The format ID is identification information for identifying the format. The start program ID is program identification information for specifying the program to start when the application form 1 is read.

FIGS. 12A, 12B, 12C, 12D, and 12E schematically illustrate the data stored in the image processing apparatus 10.

FIG. 12A illustrates the format table. The format table contains information representing a file of format data associated with the format ID. The format table includes items "format ID," "format type," and "format data."

FIG. 12B illustrates the application table. In the application table, application status and a previous application ID are associated with each other by the application ID. The application table contains information as to whether the application ID is valid or invalid. The application table includes items "application ID," "application status" corresponding to the application ID, "previous application ID," and "application status" corresponding to the previous application ID.

FIG. 12C illustrates the personal information table. The personal information table contains the personal information of a person associated with the IC card ID. The personal information table includes items "IC card ID," "name," "address," and "sex."

FIG. 12D illustrates the program table. The program table contains information representing the storage location of program data associated with the program ID. The program table includes items "program ID," "program data," and "program name."

FIG. 12E illustrates the MFP-specific ID. The MFP-specific ID is an ID unique to the image processing apparatus 10, and is stored as information used to find the application destination or the output destination, for example.

Referring back to FIG. 9, the external storage apparatus 30 includes a communication unit 31, a personal information management unit 32, a program management unit 33, a format management unit 34, an IC card management unit 35, an application management unit 36, and an access right management unit 37. These functions of the external storage apparatus 30 are implemented by the CPU 501 executing programs stored in the HD 504 in FIG. 8 and controlling the components of the external storage apparatus 30.

The external storage apparatus 30 further includes a storage unit 3000, which is implemented by the HD 504 in FIG. 8, for example. The storage unit 3000 includes an access right information storage unit 3001, an application information storage unit 3002, an IC card information storage unit 3003, a format information storage unit 3004, a program information storage unit 3005, and a personal information storage unit 3006.

The communication unit 31 (an example of a second communication unit) transmits and receives various information to and from the image processing apparatus 10.

The personal information management unit 32 manages the personal information storage unit 3006. The personal information management unit 32 acquires information from the personal information table, and stores information in the personal information table. The personal information management unit 32 further performs a process using the personal information table.

The program management unit 33 manages the program information storage unit 3005. The program management unit 33 acquires information from the program table, and stores information in the program table. The program management unit 33 further performs a process using the program table.

The format management unit 34 manages the format information storage unit 3004. The format management unit 34 acquires information from the format table, and stores information in the format table. The format management unit 34 further performs a process using the format table.

The IC card management unit 35 manages the IC card information storage unit 3003. The IC card management unit 35 acquires information from the IC card table, and stores information in the IC card table. The IC card management unit 35 further performs a process using the IC card table.

The application management unit 36 manages the application information storage unit 3002. The application management unit 36 acquires information from the application table, and stores information in the application table. The application management unit 36 further performs a process using the application table.

The access right management unit 37 manages the access right information storage unit 3001. The access right management unit 37 acquires information from the access right table, and stores information in the access right table. The access right management unit 37 further performs a process using the access right table.

FIGS. 13A, 13B, 13C, 13D, 13E, and 13F are diagrams illustrating data structures of the data stored in the external storage apparatus 30. The external storage apparatus 30 stores various data to be deployed in the image processing apparatus 10.

FIG. 13A illustrates the format table associated with the format data (i.e., format information). The format table contains information representing a file of format data associated with the format ID. The format table includes items "format ID," "format type," and "format data."

FIG. 13B illustrates the program table. The program table contains information representing the storage location of program data associated with the program ID. The program table includes items "program ID," "program data," and "program name."

FIG. 13C illustrates the application table. In the application table, the application status and the previous application ID are associated with each other by the application ID. The application table contains the application data and information as to whether the application ID is valid or invalid. If IC card authentication is executed, the application table contains an IC card-specific ID. If the application is submitted from the image processing apparatus 10, the application table contains the MFP-specific ID. The application table includes items "application ID," "application status," "previous application ID," "MFP-specific ID," "IC card-specific ID," and "application data."

FIG. 13D illustrates the personal information table. The personal information table contains the personal information of a person associated with the IC card ID. The personal information table includes items "IC card ID," "name," "address," and "sex."

FIG. 13E illustrates the IC card table. The IC card table contains a password associated with the IC card ID to read data from the IC card 2. The IC card table includes items "IC card ID," "application ID," and "IC password."

FIG. 13F illustrates the access right table. The access right table includes items "user ID" and "password."

FIG. 14 is a diagram illustrating a data structure of the IC card 2. The IC card 2 stores the IC card ID specific to the IC card 2 and the personal information of the IC card holder. The IC card 2 is secured (i.e., encrypted) with a password associated with the IC card 2, for example. With authentication using the password, the image processing apparatus 10 reads the personal information from the IC card 2. The IC card 2 further stores the IC card-specific ID as an ID specific to the IC card 2.

If the IC card 2 is the My Number card, the personal information (e.g., the name and the address) per se is not stored in the My Number card. A resident register code is stored in an IC chip of the My Number card as information for the Basic Resident Register application, and the image processing apparatus 10 acquires the address and name associated with the resident register code from the external storage apparatus 30, for example.

In the present example, the My Number card is described as an example of the IC card 2. The IC card 2, however, may be any other card storing or associated with information used for authentication and information used for application.

FIG. 15 illustrates exemplary format data of the application form 1. In the example of FIG. 15, the format of the application form 1 includes items "family name," "given name," "address," "birth year." and "birth month and day," for example, which are assigned with codes 0001, 0002, 003, 0005, and 0006, respectively. When the format data is reflected in the application form 1, the items are associated with each other based on the codes. A table of codes is illustrated in FIG. 16.

FIG. 16 illustrates a code table for the format data. For each data item input to the application form 1, an item name and a relevant code are determined based on the code table. For example, if an input format includes the item "birth year" (code 0005), the item is reflected in the output format in association with the item "birth year" (code 0005) of the output format. The relevant code indicates the relationship between items.

FIG. 17A is a diagram illustrating options displayed on the image processing apparatus 10. FIG. 17A illustrates a selection table containing a list of options for the item "address" (code 0003), for example, displayed on the image processing apparatus 10. If the input format includes the code 0003, the selection from the selection table of FIG. 17A is enabled.

FIG. 17B illustrates an example of the output format. The output format is used in both the printing of the application form 1 and the submission of the application form 1 via the network N. The output format is different from the input format in that the MFP-specific ID and the IC card-specific ID are included in the output format.

Figure 18:
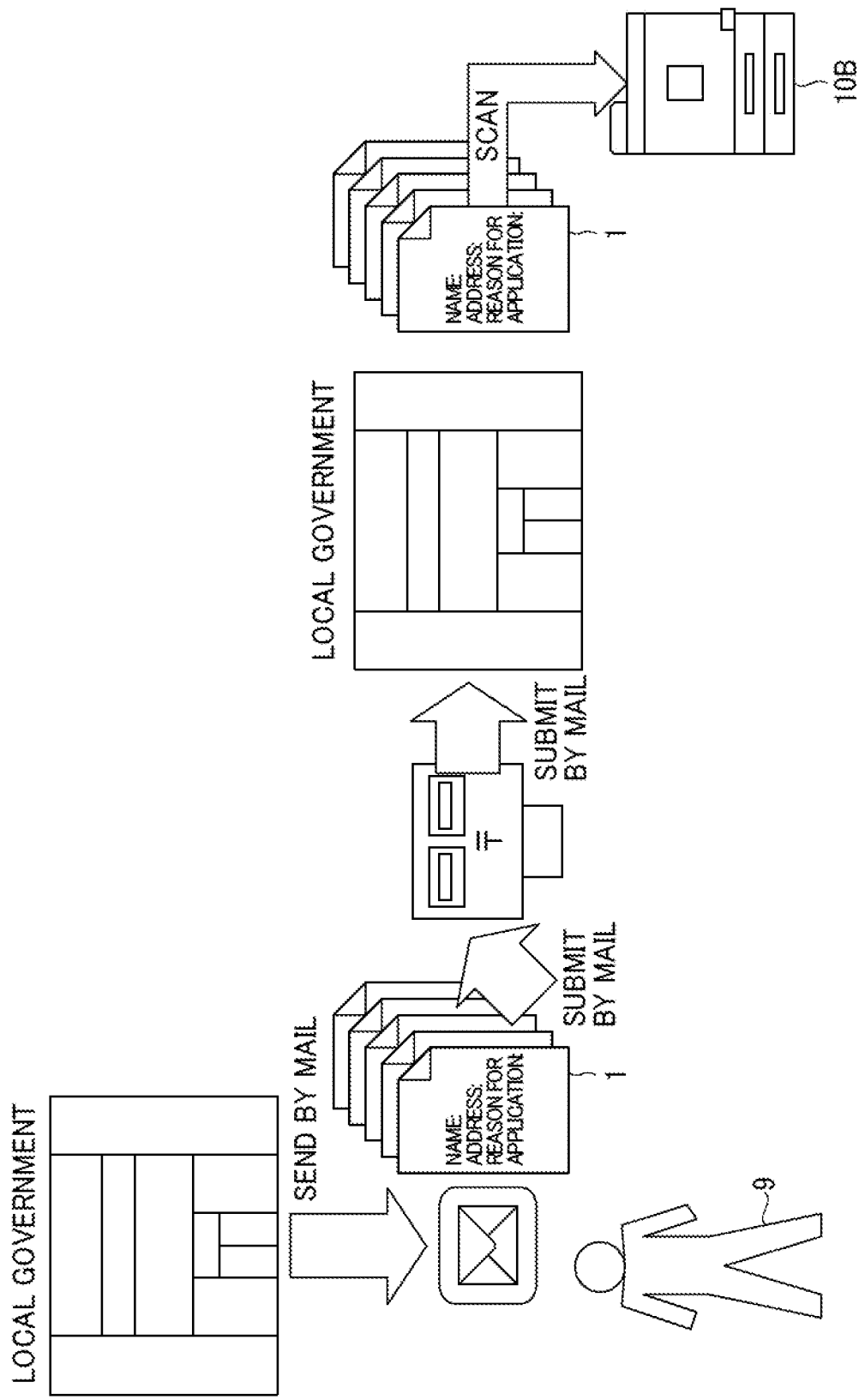
FIG. 18 is a diagram illustrating an application method of the embodiment used when there is no change in the information to provide on the application form.

With reference to FIG. 18, a description will be given of an application method of the present embodiment used when there is no change in the information to provide on the application form 1.

FIG. 18 is a diagram illustrating an application method of the present embodiment used when there is no change in the information to provide on the application form 1. The local government, from which the application form 1 is sent out and to which the application form 1 is retuned by mail, sends the applicant 9 the application form 1 embedded with the electronic watermark containing the same data as that input in the last application. If there is no need to change the information of the application form 1, the applicant 9 returns the application form 1 by mail to the local government without changing or adding to the application form 1. The application personnel of the local government then cause the image processing apparatus 10B to read the application form 1, and accept the application form 1 with the same information as that used in the last application.

Figure 19:
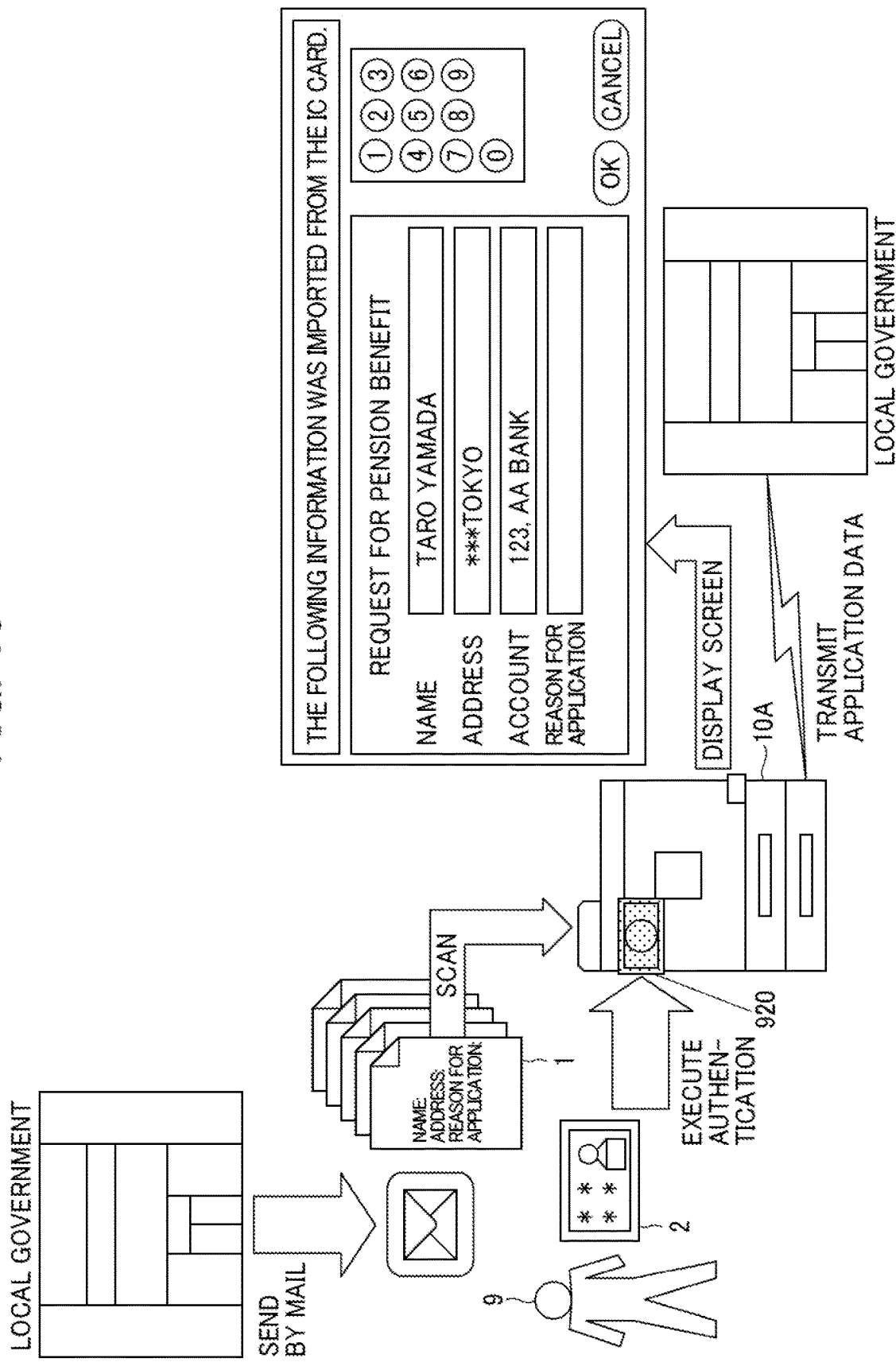
FIG. 19 is a diagram illustrating an application method of the embodiment used when there is a change in the information to provide on the application form.

FIG. 19 is a diagram illustrating an application method of the present embodiment used when there a change in the information to provide on the application form 1. The local government, from which the application form 1 is sent out and to which the application form 1 is returned by mail, sends the applicant 9 the application form 1 embedded with the electronic watermark containing the same data as that input in the last application. The applicant 9 causes the image processing apparatus 10A to read the application form 1 to acquire therefrom the electronic watermark data. The applicant 9 further causes the IC card reader 920 of the image processing apparatus 10A to read the IC card 2 to execute the authentication process. The image processing apparatus 10A acquires the format of the application form 1 and the data for use in the application from the electronic watermark data. Then, based on the personal information read from the IC card 2, the image processing apparatus 10A automatically inputs the personal information to be provided by the applicant 9. The image processing apparatus 10A transmits the application data to the local government via the network N. In the case of application by mail, on the other hand, the image processing apparatus 10A prints the application form 1 for submission by mail and invalidates the initial electronic watermark of the application form 1. The applicant 9 submits the printed application form 1 by mail to the local government to file the application with the changed information.

Figure 20:
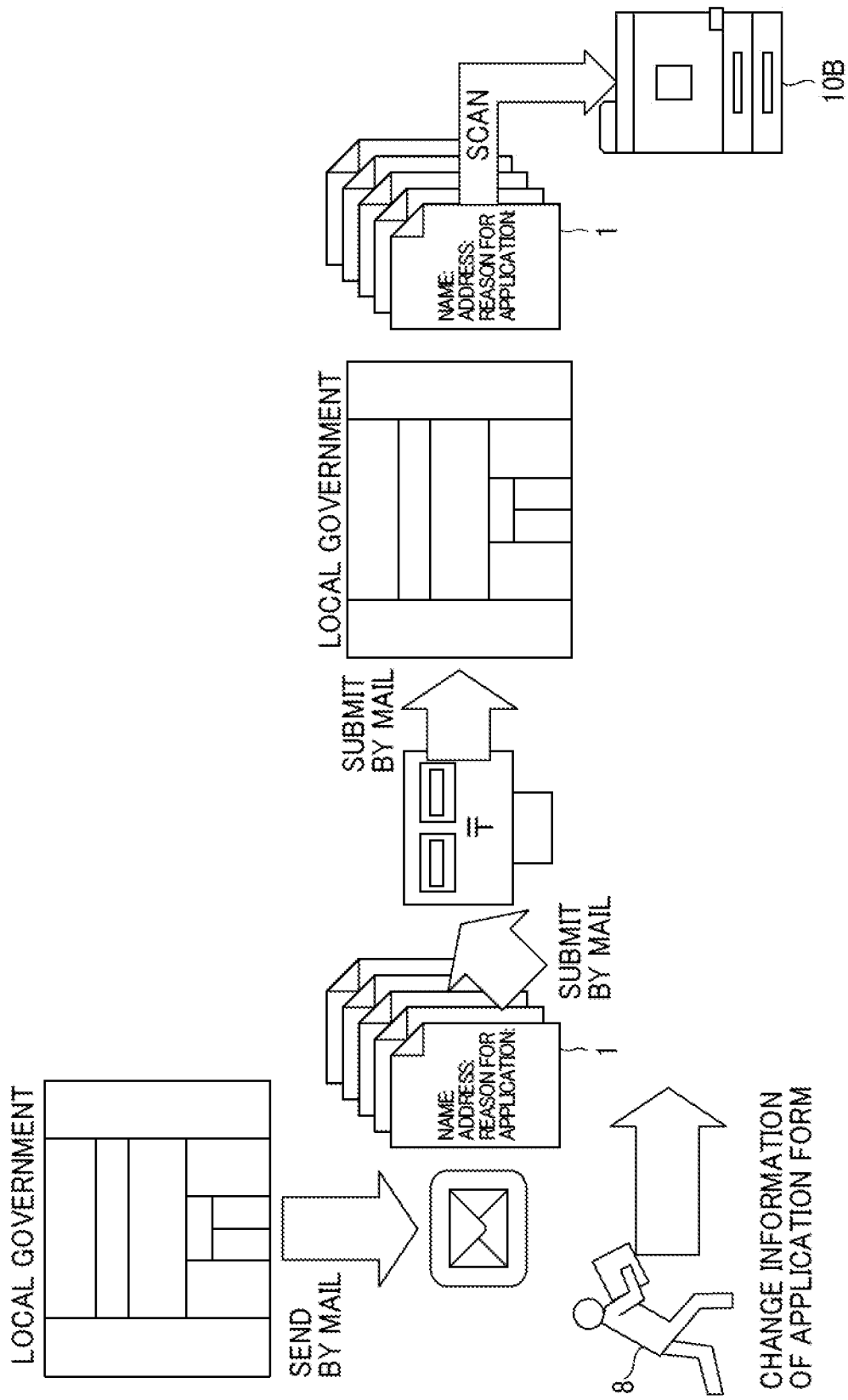
FIG. 20 is a diagram illustrating an overview of a process of the embodiment to prevent impersonation.

FIG. 20 is a diagram illustrating an overview of a process of the present embodiment to prevent impersonation. The local government, from which the application form 1 is sent out and to which the application form 1 is returned by mail, sends the applicant 9 the application form 1 embedded with the electronic watermark containing the same data as that input in the last application. The third party 8 obtains the application form 1, changes the address of the application form 1, and returns the application form 1 by mail to the local government. If the returned application form 1 is embedded with the electronic watermark, the local government accepts the application form 1, determining that there is no change in the information of the application form 1. In this case, there is no room for impersonation. The application form 1 submitted by the third party 8, on the other hand, is invalidated by the printing process. Therefore, the local government will not accept the application form 1, preventing impersonation.

Initial setting with an initial setting screen will be described with reference to FIG. 21 and subsequent drawings.

Figure 21:
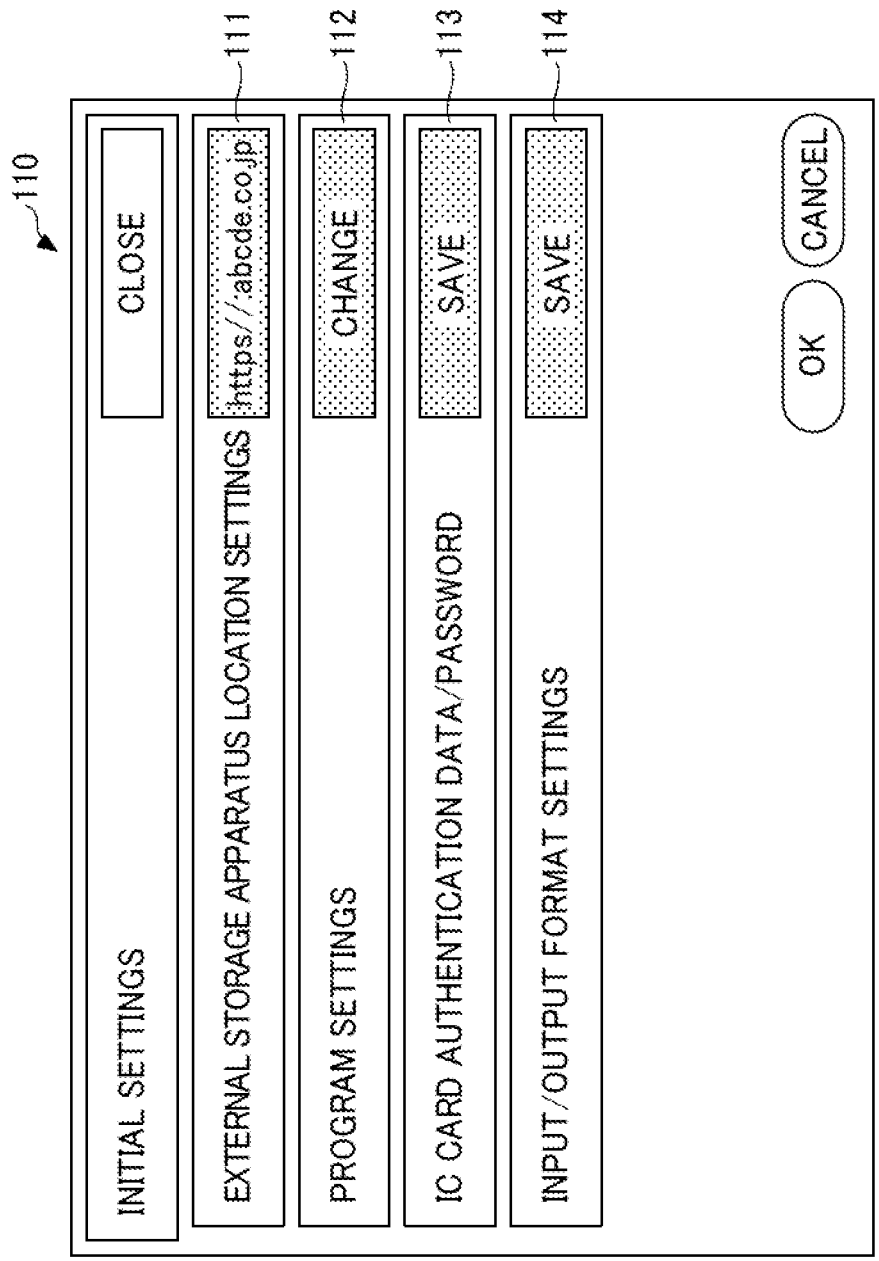
FIG. 21 is a diagram illustrating an example of an initial setting screen of the embodiment.

FIG. 21 illustrates an exemplary initial setting screen 110. The initial setting screen 110 includes an external storage apparatus location setting button 111, a program setting button 112, an IC card authentication data/password button 113, and an input/output format setting button 114.

The external storage apparatus location setting button 111 is used to set the URL of the external storage apparatus 30. Details of the setting of the external storage apparatus location will be described later with FIG. 22. The program setting button 112 is used to set a program associated with the electronic watermark. Details of the program setting will be described later with FIG. 23. The IC card authentication data/password button 113 is used to set, in the image processing apparatus 10, data associating the password of the IC card 2 with IC card authentication verification data. The input/output format setting button 114 is used to set data related to the input format or the output format.

Figure 22:
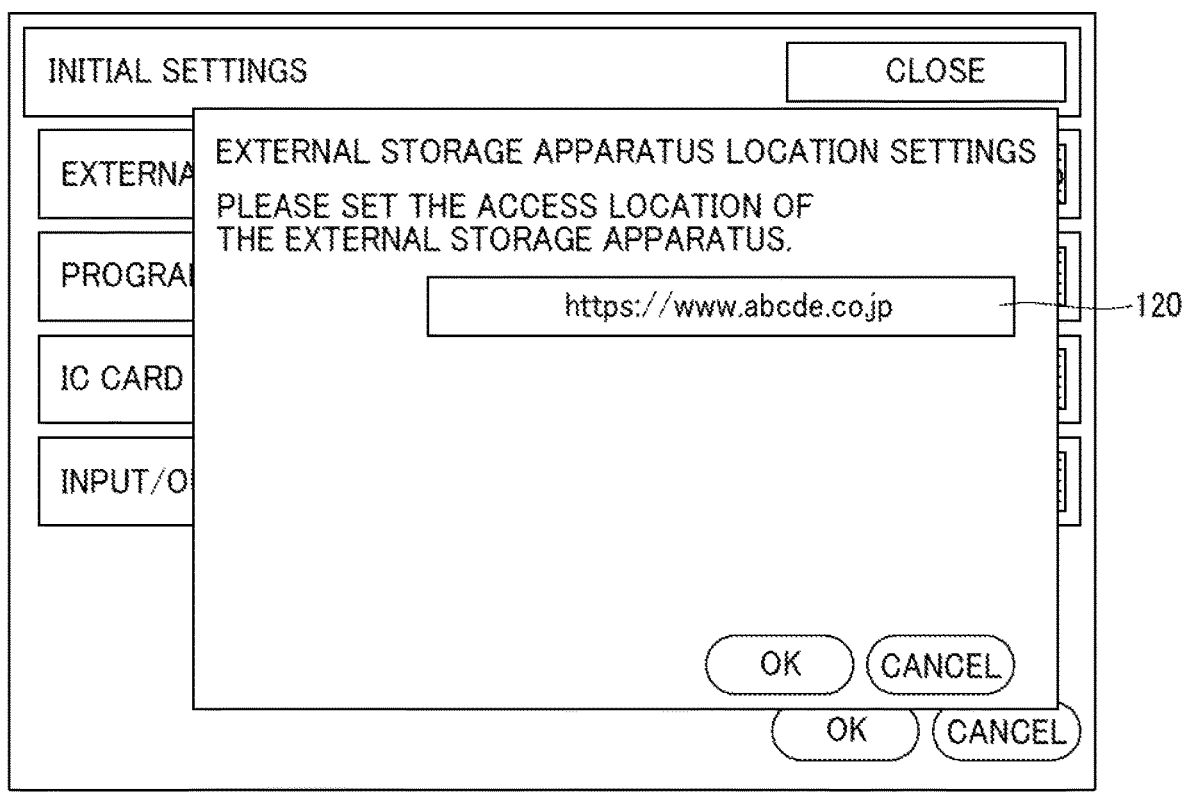
FIG. 22 is a diagram illustrating an example of an external storage apparatus location setting field displayed when an external storage apparatus location setting button in the initial setting screen of the embodiment is pressed.

FIG. 22 illustrates an external storage apparatus location setting filed 120 displayed when the external storage apparatus location setting button 111 is pressed. An administrator of the application system 100, for example, sets in the external storage apparatus location setting field 120 the access location used by the image processing apparatus 10 to communicate with the external storage apparatus 30. In the setting of the access location, a keyboard input screen is displayed.

Figure 23:
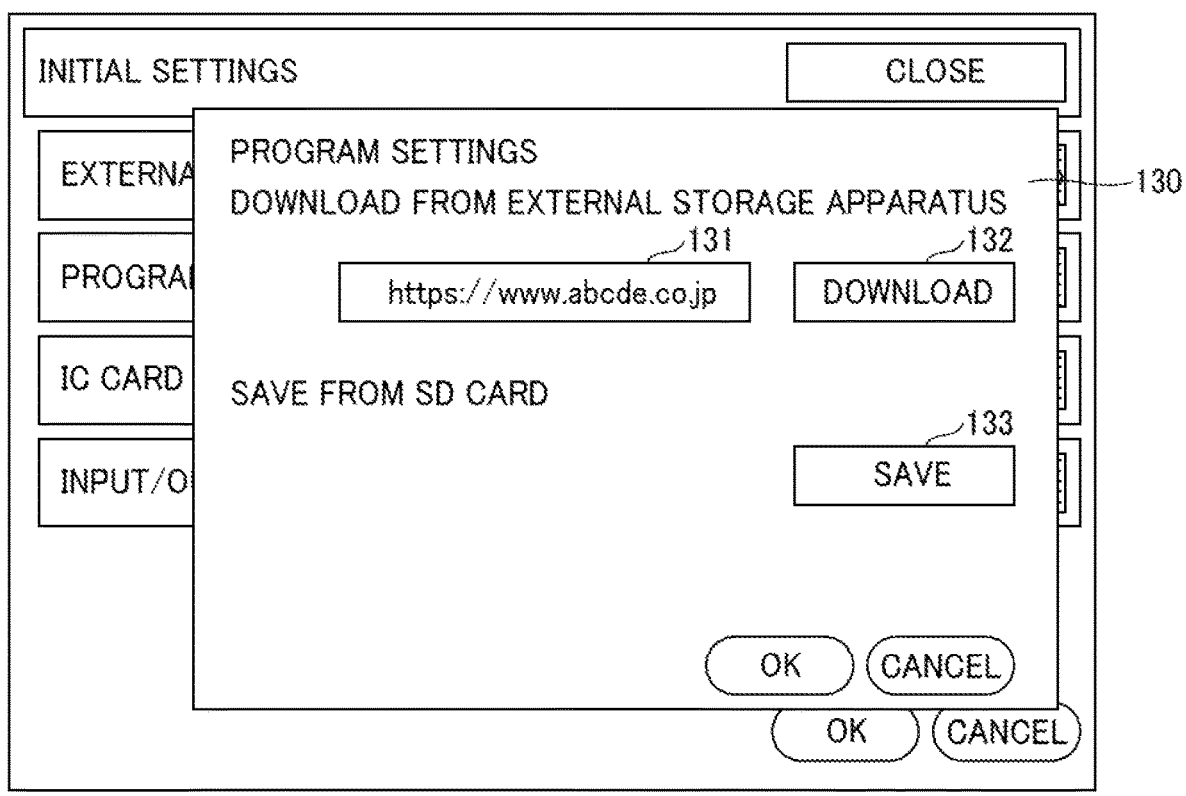
FIG. 23 is a diagram illustrating an example of a download source setting window displayed when a program setting button in the initial setting screen of the embodiment is pressed.

FIG. 23 illustrates a download source setting window 130 displayed when the program setting button 112 is pressed. The administrator specifies a URL 131 and presses a download button 132 to display a list of programs. The administrator may further press a save button 133 to cause the image processing apparatus 10 to acquire the programs from a secure digital (SD®) card.

Figure 24:
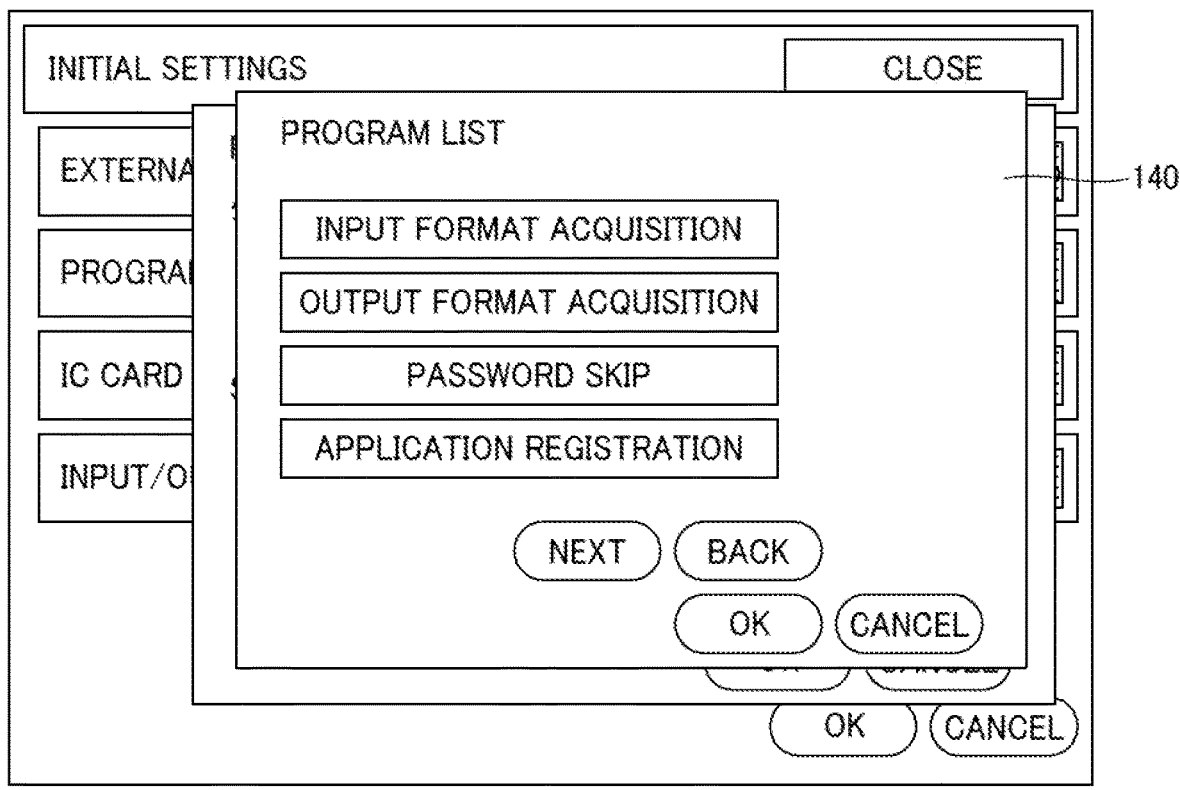
FIG. 24 is a diagram illustrating a program list displayed when a download button in the download source setting window of the embodiment is pressed.

FIG. 24 illustrates a program list 140 displayed when the download button 132 is pressed. The program list 140 displays a list of programs downloadable from the external storage apparatus 30 based on program storage settings. The administrator selects a desired one of the programs to store the program in the image processing apparatus 10. A procedure similar to the above-described one may be taken to acquire a program from the SD card.

Figure 25:
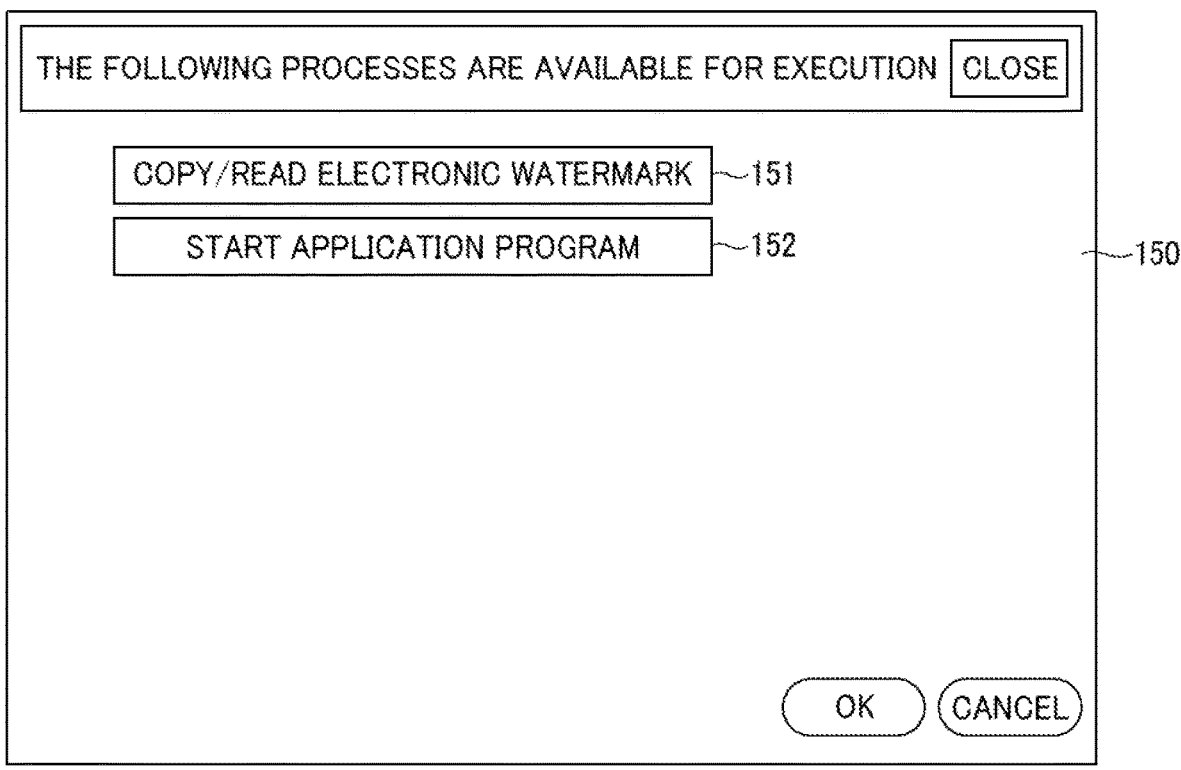
FIG. 25 is a diagram illustrating an example of a process execution screen displayed on an operation panel of the image processing apparatus of the embodiment when executing a process.

FIG. 25 illustrates a process execution screen 150 displayed on the operation panel 940 when executing a process. The process execution screen 150 includes a copy/electronic watermark read button 151 and an application program start button 152. To cause the image processing process 10 to read the application form 1, the applicant 9 presses the copy/electronic watermark read button 151. When the application form 1 with the electronic watermark is read, a program according to an instruction embedded in the read electronic watermark starts. If there is no such program, a copy operation is executed.

Figure 26:
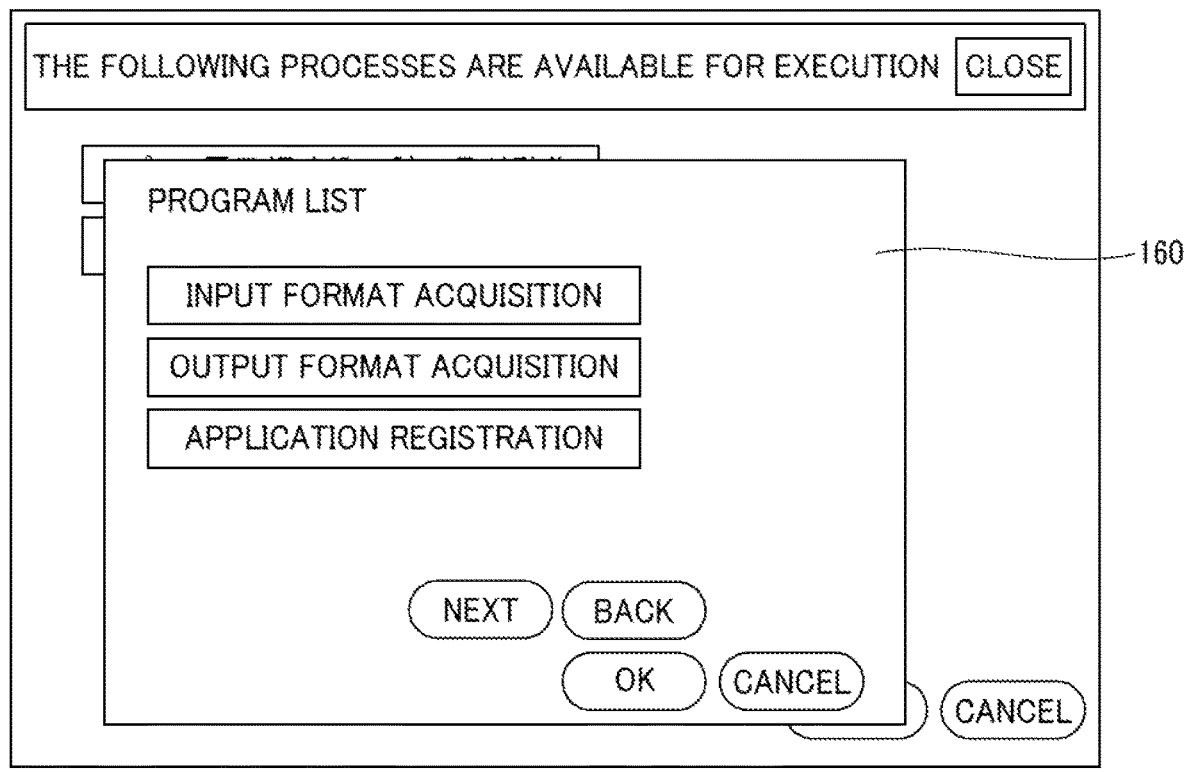
FIG. 26 is a diagram illustrating an example of a program list screen displayed when an application program start button in the process execution screen of the embodiment is pressed.

If the application program start button 152 is pressed, a list of programs not requiring the electronic watermark to start is displayed, as illustrated in FIG. 26.

FIG. 26 illustrates a program list screen 160 displayed when the application program start button 152 is pressed. The program list screen 160 displays the list of programs not requiring the electronic watermark to start. The applicant 9 selects a desired program from the program list.

Procedures of processes and operations performed by the application system 100 will be described.

Figure 27:
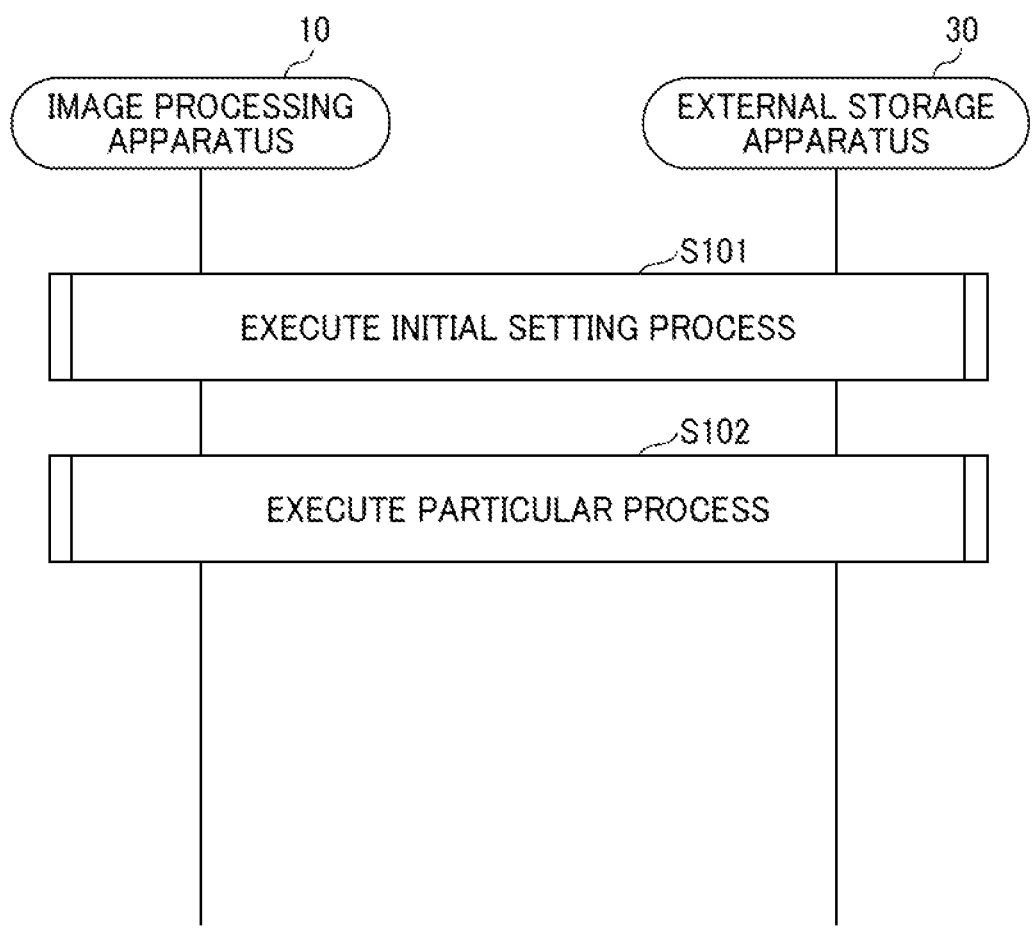
FIG. 27 is a sequence diagram illustrating an exemplary overall process of the application system of the embodiment.

FIG. 27 is a sequence diagram illustrating an exemplary overall process of the application system 100.

At step S101, an initial setting process is executed. The initial setting process is a process executed in the first communication between the image processing apparatus 10 and the external storage apparatus 30.

At step S102, a particular process is executed between the image processing apparatus 10 and the external storage apparatus 30.

Figure 28:
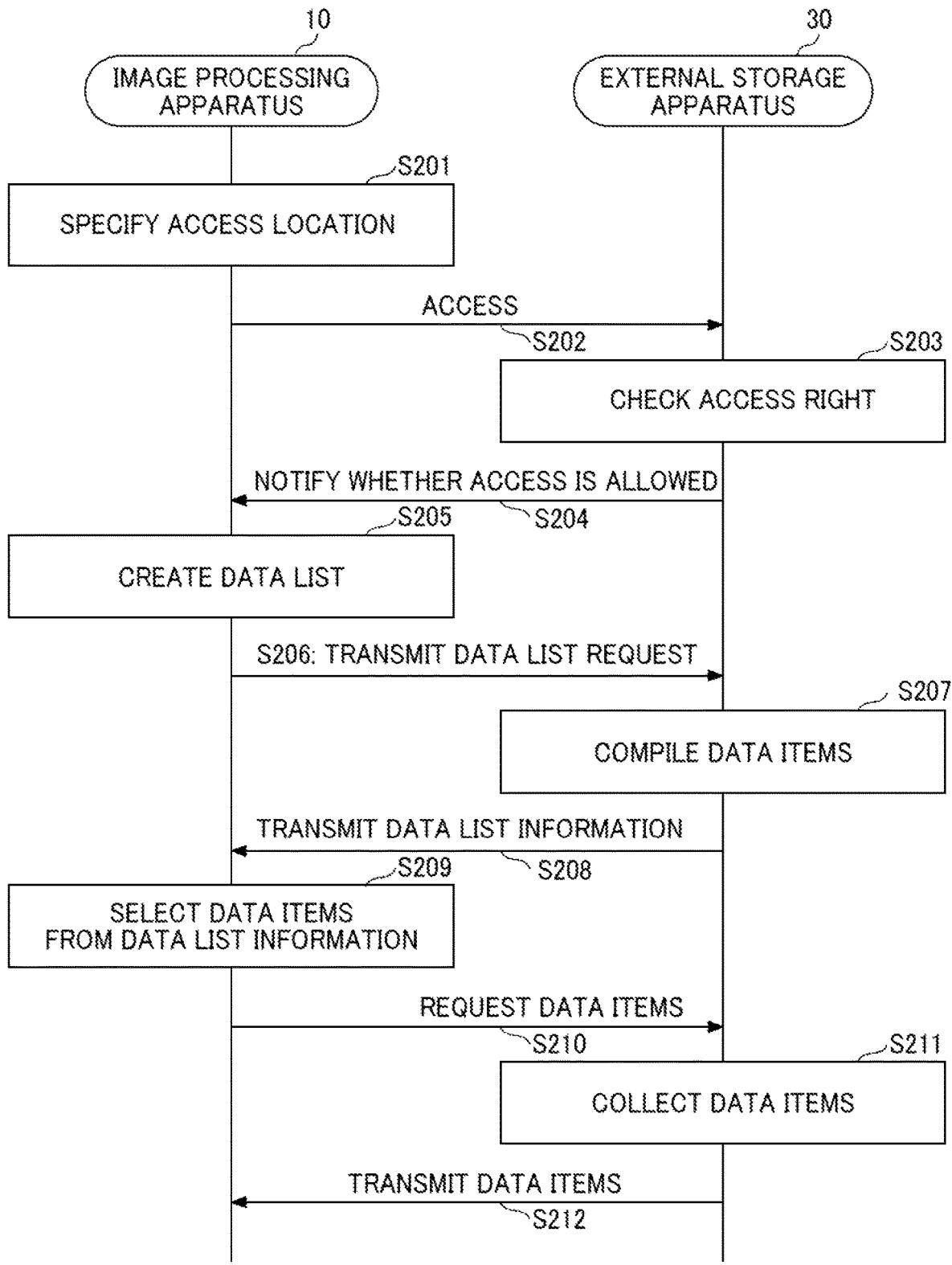
FIG. 28 is a sequence diagram illustrating an exemplary initial setting process of the application system of the embodiment.

FIG. 28 is a sequence diagram illustrating an example of the initial setting process.

At step S201, the administrator sets the access location on the initial setting screen 110, and the operation receiving unit 19 of the image processing apparatus 10 receives the settings.

At step S202, the communication unit 11 of the image processing apparatus 10 accesses the external storage apparatus 30 as the access location.

At step S203, the external storage apparatus 30 checks whether the access by the image processing apparatus 10 is allowed based on an apparatus ID of the image processing apparatus 10, for example.

At step S204, if the access by the image processing apparatus 10 is allowed, the external storage apparatus 30 returns a message to the image processing apparatus 10 to notify that the image processing apparatus 10 is allowed to access the external storage apparatus 30.

At steps S205 and S206, the communication unit 11 of the image processing apparatus 10 transmits a data list request to the external storage apparatus 30 to request a list of desired data items. The data list includes data items to be copied to the image processing apparatus 10 from the external storage apparatus 30, such as the input format, the output format, and a program.

At steps S207 and S208, the communication unit 31 of the external storage apparatus 30 receives the data list request, compiles the requested data items from a variety of data, and returns data list information including the data items to the image processing apparatus 10.

At steps S209 and S210, the image processing apparatus 10 selects desired data items from the data list information, and requests the external storage apparatus 30 to transmit the selected data items.

At step S211, the external storage apparatus 30 collects the selected data items.

At step S212, the external storage apparatus 30 transmits the requested data items to the image processing apparatus 10. Thereby, the data items stored in the external storage apparatus 30 are copied to the image processing apparatus 10.

With reference to FIGS. 29 to 42, a description will be given of an application process in which the applicant 9 submits the application based on the application form 1.

FIGS. 29 to 34 are diagrams illustrating overall processes. FIGS. 35 to 42 are flowcharts illustrating more detailed processes.

Figure 29:
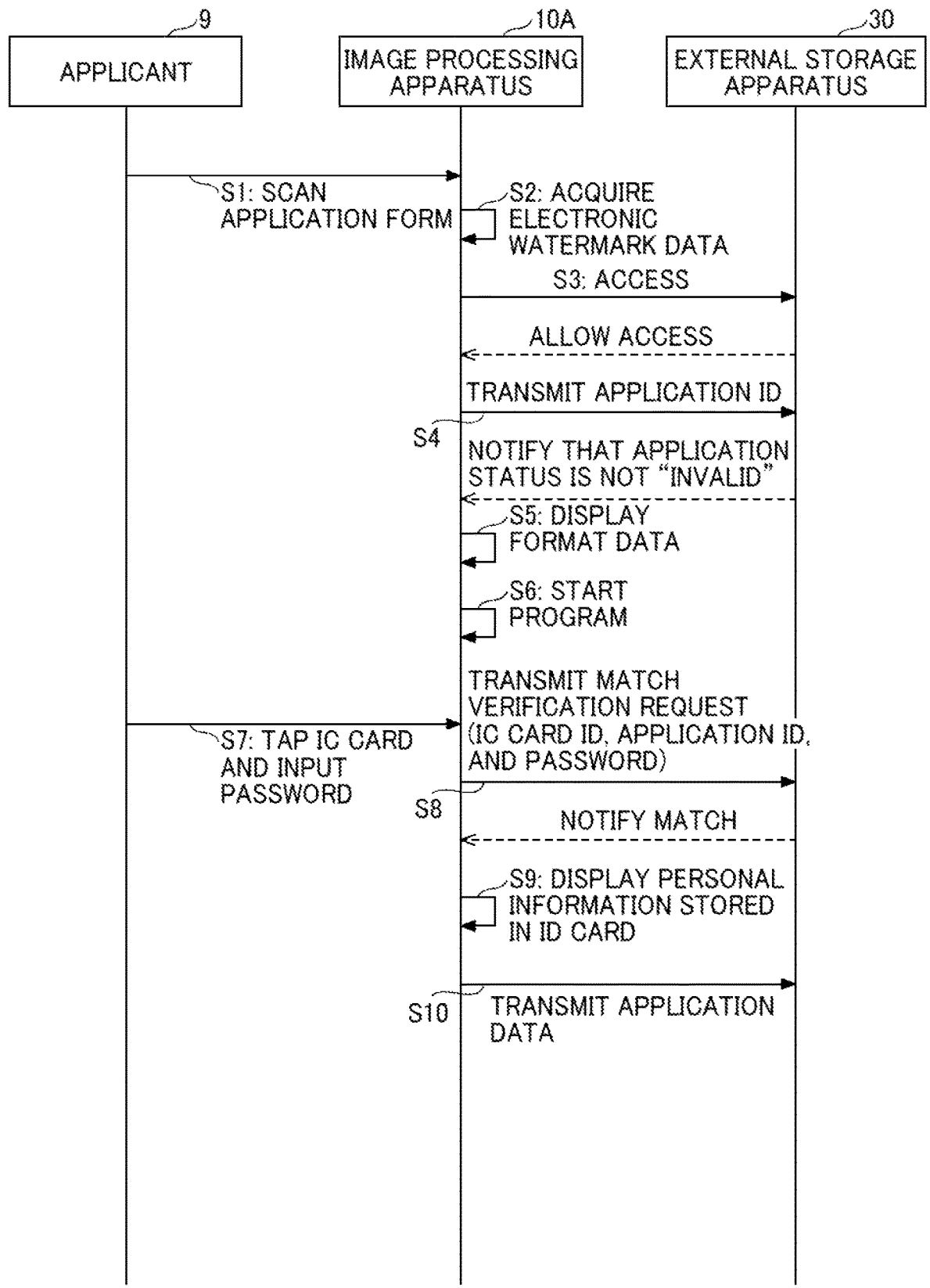
FIG. 29 is a sequence diagram illustrating an application process with IC card authorization of the embodiment performed when there is no change in the information to provide on the application form.
Figure 30:
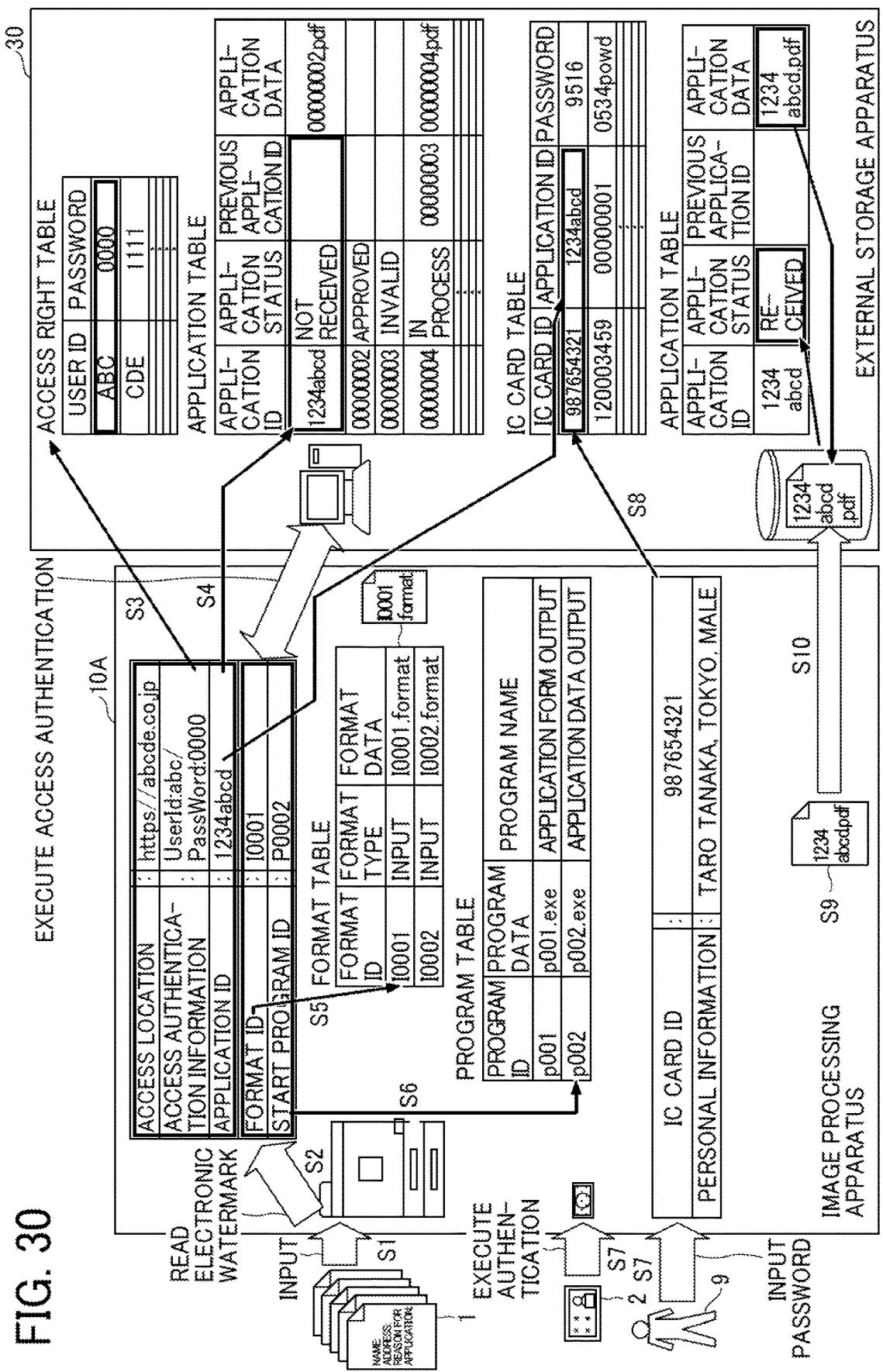
FIG. 30 is a schematic diagram illustrating the application process of FIG. 29.

FIG. 29 is a sequence diagram illustrating an application process with IC card authorization performed when there is no change in the information to provide on the application form 1. FIG. 30 schematically illustrates the application process of FIG. 29. The same step numbers are used throughout FIGS. 29 and 30. In FIG. 29, a broken arrow line indicates a response message. The same applies to the subsequent sequence diagrams.

At step S1, the applicant 9 causes the image processing apparatus 10A to read the application form 1.

At step S2, in the image processing apparatus 10A, the document reading unit 12 reads the application form 1, and the electronic watermark data acquisition unit 13 acquires the electronic watermark data embedded in the application form 1.

At step S3, the communication unit 11 of the image processing apparatus 10A accesses the external storage apparatus 30 with the access location of the external storage apparatus 30 and the access authentication information included in the electronic watermark data. In the external storage apparatus 30, the communication unit 31 receives the access from the image processing apparatus 10A, and the access right management unit 37 searches through the access right table for the access authentication information. If the access authentication information is found in the access right table, the access right management unit 37 allows the access (i.e., determines successful authentication) of the image processing apparatus 10A.

At step S4, being allowed to access the external storage apparatus 30, the communication unit 11 of the image processing apparatus 10A transmits the application ID included in the electronic watermark data to the external storage apparatus 30. In the external storage apparatus 30, the communication unit 31 receives the application ID. Then, the application management unit 36 checks the application table to find the application status corresponding to the application ID transmitted from the image processing apparatus 10A, and determines that the application status is not "invalid." The communication unit 31 then transmits to the image processing apparatus 10A a notification that the application status is not "invalid."

At step S5, the communication unit 11 of the image processing apparatus 10A receives the notification that the application status is not "invalid," and accepts an instruction to create the application form 1. The format display unit 14 of the image processing apparatus 10A then retrieves the format data corresponding to the format ID from the format table, and displays the format data on the operation panel 940 of the image processing apparatus 10A.

At step S6, the program start unit 15 of the image processing apparatus 10A similarly retrieves the program corresponding to the start program ID from the program table, and starts the program.

At step S7, the applicant 9 causes the IC card reader 920 of the image processing apparatus 10A to read the IC card 2, and inputs the password to the image processing apparatus 10A. In the image processing apparatus 10A, the IC card information acquisition unit 16 acquires the IC card information, and the operation receiving unit 19 receives the password. If the image processing apparatus 10A is set to skip the password, the authentication unit 18 determines successful authentication without the password input. This is because identity verification will be executed later at step S8 with the application ID and the IC card 2. The applicant 9 is therefore allowed to continue the application process even if the password is forgotten.

At step S8, via the communication unit 11, the identity verification unit 17 of the image processing apparatus 10A transmits a match verification request to the external storage apparatus 30 to verify the match between the applicant 9 and the application ID by specifying the IC card ID, the application ID, and the password. In the external storage apparatus 30, the communication unit 31 receives the match verification request, and the IC card management unit 35 executes the IC card authentication by determining whether the IC card ID and the password match with reference to the IC card table. If the match between the IC card ID and the password is determined, the IC card management unit 35 determines whether the application ID associated with the IC card ID in the IC card table matches the application ID included in the electronic watermark data. The communication unit 31 then transmits a notification to the image processing apparatus 10A to notify the result of user authentication (i.e., match or non-match).

At step S9, if the communication unit 11 of the image processing apparatus 10A receives a notification of match, the identity verification unit 17 determines successful identity verification. In the image processing apparatus 10A, the IC card information acquisition unit 16 transfers the personal information stored in the IC card 2 to the format display unit 14. If there is no change in the personal information such as the address, the format display unit 14 creates the application data by reflecting the personal information in the format data indicated by the format ID.

If the communication unit 11 receives a notification of non-match, the identity verification unit 17 displays a message notifying a failure to create the application form 1, and completes the application process.

If the match between the IC card ID and the application ID has been verified, the application process may proceed without the password input of step S7, depending on the program. Further, the personal information may be input via the operation panel 940 with a software keyboard or a handwriting input system to reflect the personal information in the format data.

At step S10, in the image processing apparatus 10A, the application data registration unit 25 transmits the application data including the electronic watermark data (e.g., the application ID) to the external storage apparatus 30 via the communication unit 11. In the external storage apparatus 30, the communication unit 31 receives the application data, and the application management unit 36 changes the application status associated with the application ID included in the electronic watermark data and registered in the application table to "received." The application management unit 36 then stores the application data and stores the storage location of the application data in the application table.

According to the above-described application process, even if a third party obtains the application form 1, there is no match between the application ID included in the electronic watermark data and the application ID associated with the IC card ID, consequently preventing impersonation.

Figure 31:
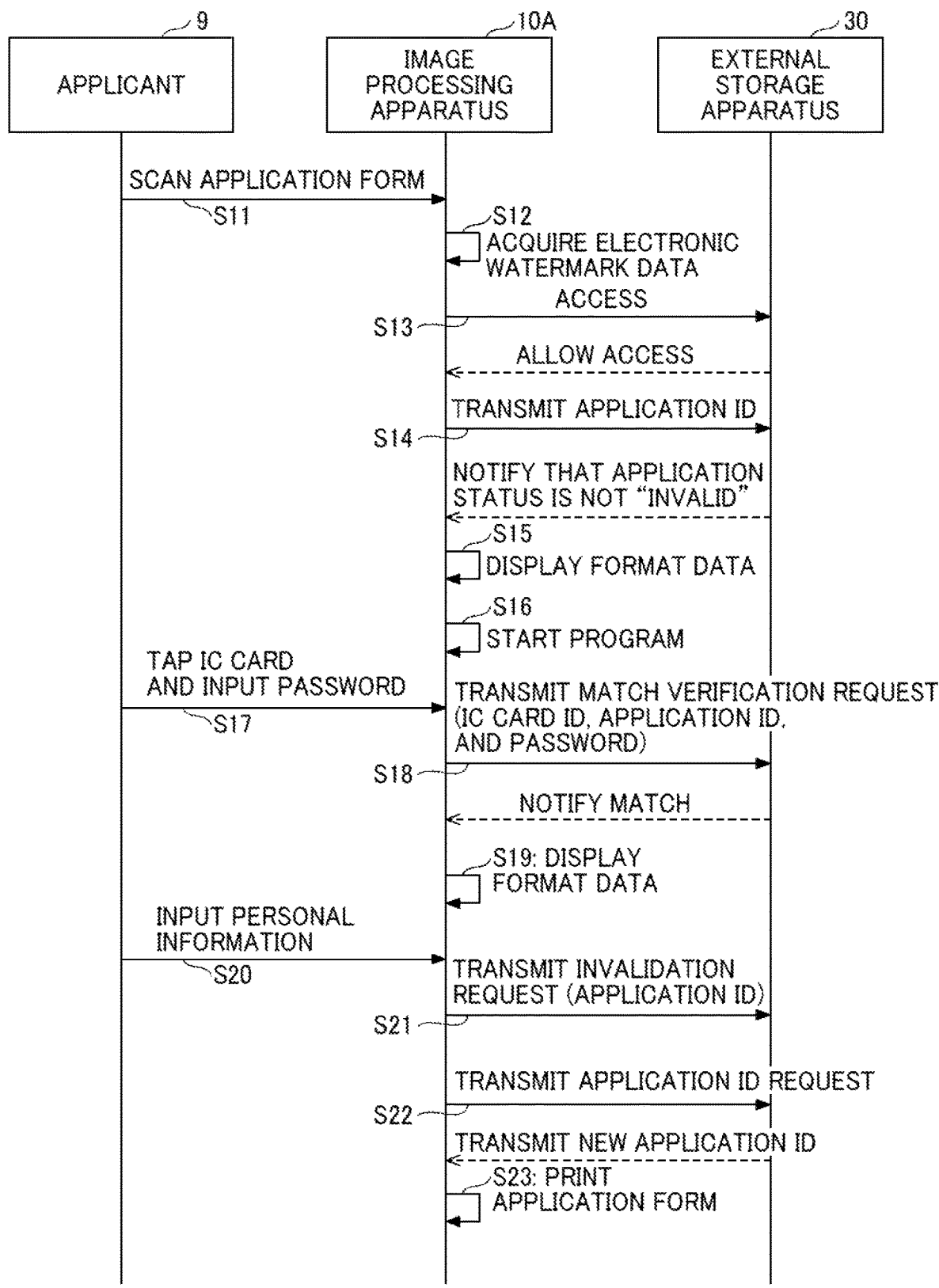
FIG. 31 is a sequence diagram illustrating an application process of the embodiment, in which an applicant prints an application form.
Figure 32:
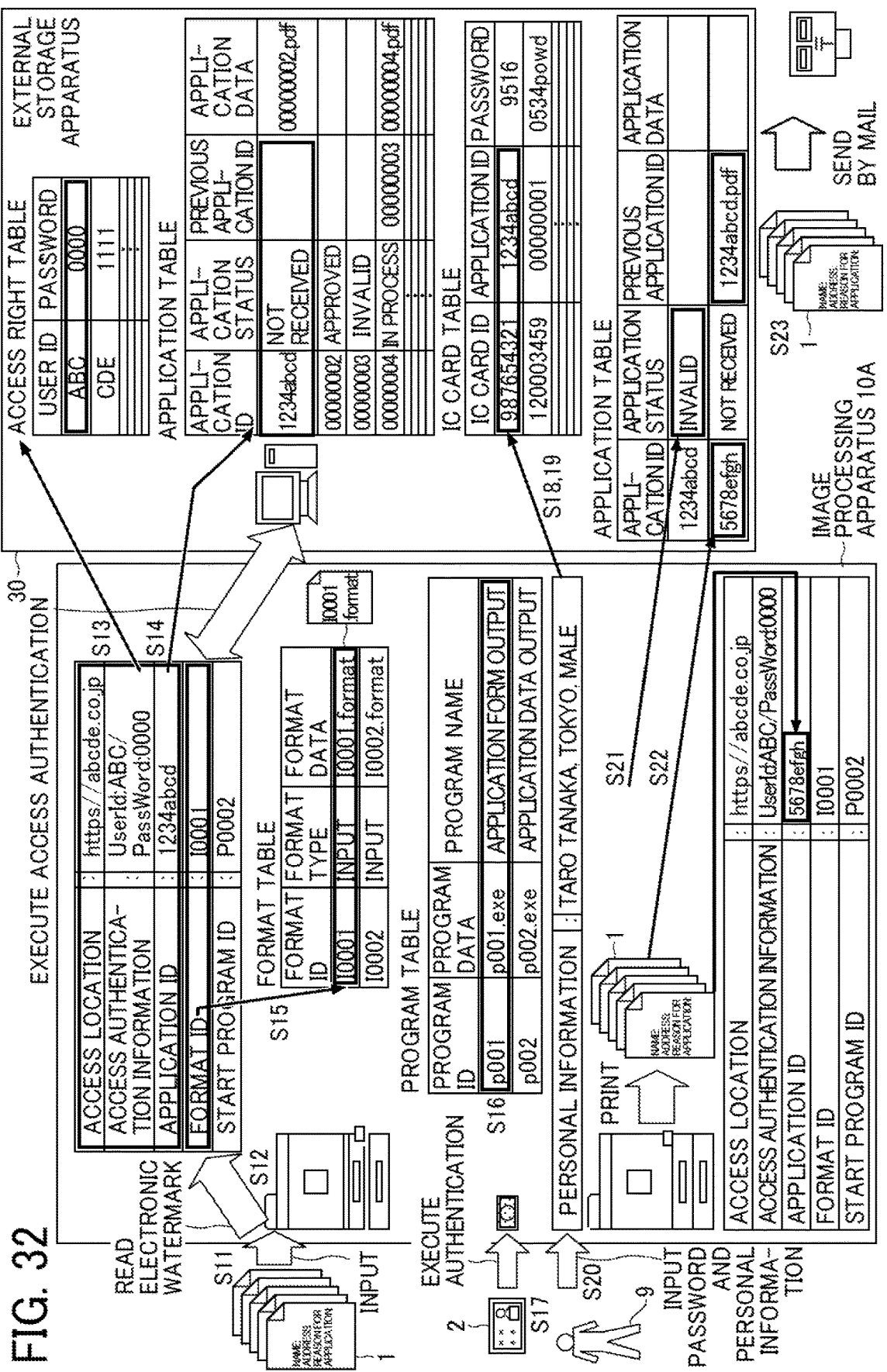
FIG. 32 is a schematic diagram illustrating the application process of FIG. 31.

FIG. 31 is a sequence diagram illustrating an application process in which the applicant 9 prints the application form 1. FIG. 32 schematically illustrates the application process of FIG. 31. The same step numbers are used throughout FIGS. 31 and 32.

At step S11, the applicant 9 causes the image processing apparatus 10A to read the application form 1.

At step S12, in the image processing apparatus 10A, the document reading unit 12 reads the application form 1, and the electronic watermark data acquisition unit 13 acquires the electronic watermark data embedded in the application form 1.

At step S13, the communication unit 11 of the image processing apparatus 10A accesses the external storage apparatus 30 with the access location of the external storage apparatus 30 and the access authentication information included in the electronic watermark data. In the external storage apparatus 30, the communication unit 31 receives the access from the image processing apparatus 10A, and the access right management unit 37 searches through the access right table for the access authentication information. If the access authentication information is found in the access right table, the access right management unit 37 allows the access (i.e., determines successful authentication) of the image processing apparatus 10A.

At step S14, being allowed to access the external storage apparatus 30, the communication unit 11 of the image processing apparatus 10A transmits the application ID included in the electronic watermark data to the external storage apparatus 30. In the external storage apparatus 30, the application management unit 36 checks the application table to find the application status corresponding to the application ID transmitted from the image processing apparatus 10A, and determines that the application status is not "invalid." The communication unit 31 then transmits to the image processing apparatus 10A a notification that the application status is not "invalid." At step S15, in the image processing apparatus 10A, the communication unit 11 receives the notification that the application status is not "invalid," and the format display unit 14 retrieves the format data corresponding to the format ID from the format table, and displays the format data on the operation panel 940 of the image processing apparatus 10A.

At step S16, the program start unit 15 of the image processing apparatus 10A similarly retrieves the program corresponding to the start program ID from the program table, and starts the program. It is assumed here that the applicant 9 has manually selected an application form output program to print the application form 1.

At step S17, the applicant 9 executes the authentication with the IC card 2, and the IC card information acquisition unit 16 of the image processing apparatus 10A acquires the IC card information. The applicant 9 inputs the password to the image processing apparatus 10A, and the operation receiving unit 19 of the image processing apparatus 10A receives the input password.

At step S18, via the communication unit 11, the identity verification unit 17 of the image processing apparatus 10A transmits a match verification request to the external storage apparatus 30 to verify the match between the applicant 9 and the application ID by specifying the IC card ID, the application ID, and the password. In the external storage apparatus 30, the communication unit 31 receives the match verification request, and the IC card management unit 35 executes the IC card authentication by determining whether the IC card ID and the password match with reference to the IC card table. If the match between the IC card ID and the password is determined, the IC card management unit 35 determines whether the application ID associated with the IC card ID in the IC card table matches the application ID included in the electronic watermark data. The communication unit 31 then transmits a notification to the image processing apparatus 10A to notify the result of user authentication (i.e., match or non-match).

At step S19, if the communication unit 11 of the image processing apparatus 10A receives the result of user authentication indicating the match, the identity verification unit 17 verifies the identity of the applicant 9. The format display unit 14 of the image processing apparatus 10A then creates the application data by reflecting the personal information in the format data indicated by the format ID.

If the communication unit 11 receives the result of user authentication indicating the non-match, the identity verification unit 17 displays a message notifying a failure to create the application form 1, and completes the application process.

At step S20, the applicant 9 inputs the personal information on the operation panel 940, and the operation receiving unit 19 of the image processing apparatus 10A receives the input. Thereby, the application data is created with the input items associated with the personal information.

At step S21, to invalidate the application ID of the application form 1 read by the image processing apparatus 10A, the invalidation request unit 21 of the image processing apparatus 10A transmits an invalidation request to the external storage apparatus 30 to invalidate the application ID. The application status of the application form 1 is invalidated by each printing process, thereby helping the local government to prevent impersonation with the application form 1 discarded after the application. In the external storage apparatus 30, the communication unit 31 receives the invalidation request, and the application management unit 36 changes the application status associated with the target application ID in the application table to "invalid."

At step S22, the application ID request unit 22 of the image processing apparatus 10A transmits an application ID request to the external storage apparatus 30 to issue a new application ID for creating a new application form 1. In the external storage apparatus 30, the communication unit 31 receives the application ID request, and the application management unit 36 issues and registers a new application ID in the application table, and sets an application status "not received" to the new application ID.

At step S23, the print unit 23 of the image processing apparatus 10A prints the application form 1 with the electronic watermark embedded with the new application ID. Then, the applicant 9 sends the printed application form 1 by mail to the local government.

Figure 33:
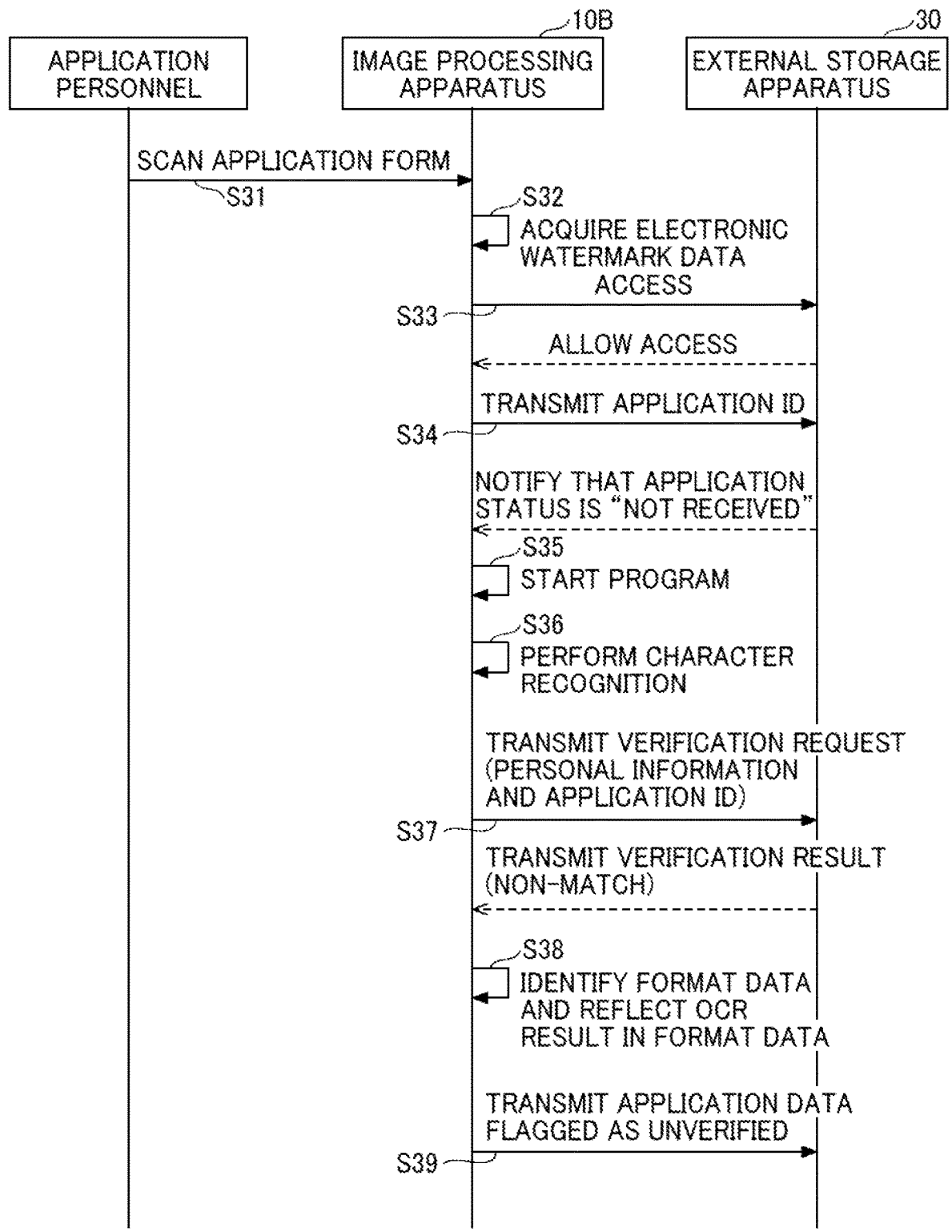
FIG. 33 is a sequence diagram illustrating a process of the embodiment performed by the image processing apparatus of a local government to prevent impersonation with an application form submitted by mail.
Figure 34A:
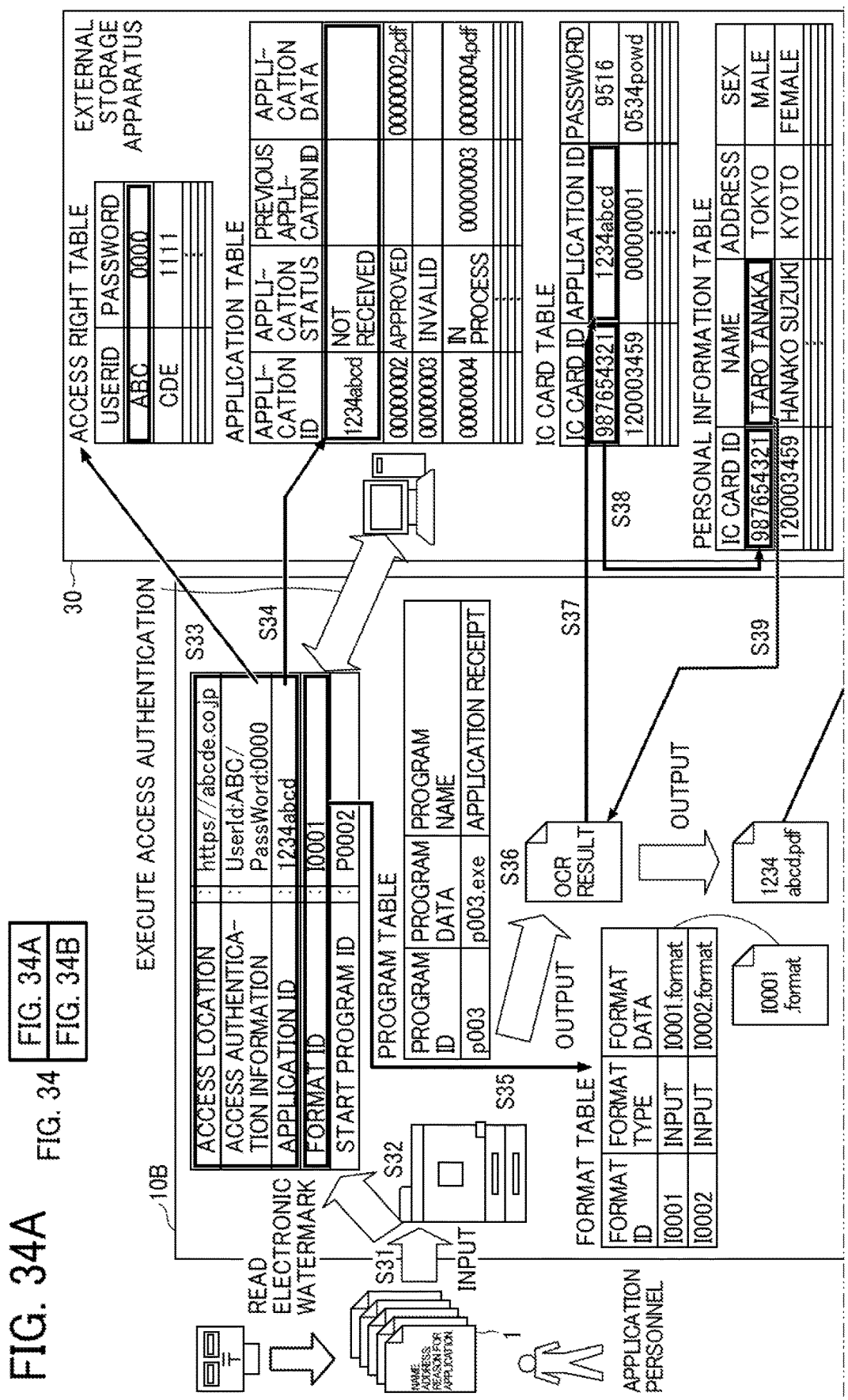
FIGS. 34A and 34B (FIG. 34) are schematic diagrams illustrating the process of FIG. 33.
Figure 34B:
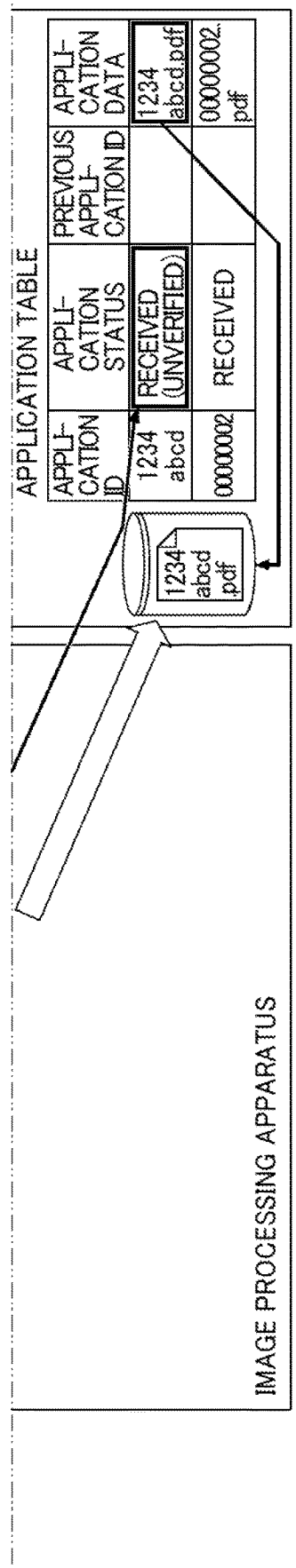

FIG. 33 is a sequence diagram illustrating a process performed by the image processing apparatus 10B of the local government to prevent impersonation with the application form 1 submitted by mail. FIGS. 34A and 34B (FIG. 34) schematically illustrate the process of FIG. 33. The same step numbers are used throughout FIGS. 33 and 34.

At step S31, the application personnel cause the image processing apparatus 10B to read the application form 1 submitted by mail.

At step S32, in the image processing apparatus 10B, the document reading unit 12 reads the application form 1, and the electronic watermark data acquisition unit 13 acquires the electronic watermark data embedded in the application form 1.

At step S33, the communication unit 11 of the image processing apparatus 10B accesses the external storage apparatus 30 with the access location of the external storage apparatus 30 and the access authentication information included in the electronic watermark data. In the external storage apparatus 30, the communication unit 31 receives the access from the image processing apparatus 10B, and the access right management unit 37 searches through the access right table for the access authentication information. If the access authentication information is found in the access right table, the access right management unit 37 allows the access (i.e., determines successful authentication) of the image processing apparatus 10B.

At step S34, being allowed to access the external storage apparatus 30, the communication unit 11 of the image processing apparatus 10B transmits the application ID included in the electronic watermark data to the external storage apparatus 30. In the external storage apparatus 30, the application management unit 36 checks the application table to find the application status corresponding to the application ID transmitted from the image processing apparatus 10B, and determines that the application status is "not received." The communication unit 31 then transmits to the image processing apparatus 10B a notification that the application status is "not received." Since the application form 1 is submitted by mail in the example of FIG. 33, it is determined that the application status corresponding to the newly issued application ID is "not received."

At step S35, the communication unit 11 of the image processing apparatus 10B accepts the sheet of the application form 1 if the application status of the application form 1 is "not received (unreceived)." The program start unit 15 of the image processing apparatus 10B retrieves the program corresponding to the start program ID from the program table, and starts the program. It is assumed here that the application personnel have manually selected an application receiving program.

At step S36, the character recognition unit 20 of the image processing apparatus 10B performs the character recognition on the image data of the application form 1 to acquire the personal information described in the application form 1.

At step S37, via the communication unit 11, the identity verification unit 17 of the image processing apparatus 10B transmits a personal information verification request to the external storage apparatus 30 by specifying the personal information acquired through the character recognition (an example of first personal information) and the application ID included in the electronic watermark data. In the external storage apparatus 30, the communication unit 31 receives the personal information verification request, and the IC card management unit 35 acquires the IC card ID associated with the application ID from the IC card table. The personal information management unit 32 then acquires the personal information associated with the IC card ID (an example of second personal information) from the personal information table. Then, the personal information management unit 32 compares the two types of personal information: the personal information acquired through the OCR process and the personal information acquired from the personal information table. It is assumed in the example of FIG. 33 that the result of the compassion indicates non-match. The communication unit 31 of the external storage apparatus 30 then transmits the comparison result (e.g., non-match) to the image processing apparatus 10B.

At step S38, in the image processing apparatus 10B, the communication unit 11 receives the comparison result (i.e., non-match), and the identity verification unit 17 determines possible impersonation. The document creation unit 24 of the image processing apparatus 10B then identifies the format data associated with the format ID included in the electronic watermark data, and creates the application data by reflecting the result of the OCR process in the format data.

At step S39, to indicate that the application data involves possible impersonation, the application data registration unit 25 of the image processing apparatus 10B transmits the application data to the external storage apparatus 30 via the communication unit 11 by attaching a notification of possible impersonation to the application data. In the external storage apparatus 30, the communication unit 31 receives the application data, and the application management unit 36 changes the application status associated with the application ID stored in the application table of the external storage apparatus 30 to "received (unverified)." In this case. "unverified" indicates possible impersonation. The image processing apparatus 10B stores the application data, and updates the storage location of the application data.

Details of the processes and operations performed by the application system 100 will be described with the flowcharts of FIGS. 35 to 42.

FIG. 35 is a flowchart illustrating an overview of a process of the image processing apparatus 10. FIG. 35 illustrates a procedure of the process. In the image processing apparatus 10, the operation receiving unit 19 first determines whether the button pressed in the process execution screen 150 (see FIG. 25) is the copy/electronic watermark read button 151 (step S301). If it is determined that the pressed button is the copy/electronic watermark read button 151 (YES at step S301), the document reading unit 12 reads the application form 1, and the electronic watermark data acquisition unit 13 determines the presence or absence of the electronic watermark in the application form 1 (step S302). If the electronic watermark data is detected in the application form 1, i.e., if the application form 1 is an electronically watermarked document (YES at step S302), the electronic watermark data acquisition unit 13 acquires the electronic watermark data from the image data of the application form 1 (step S303). The program start unit 15 then starts the program based on the electronic watermark data (step S304). Details of the program start process will be described later with FIG. 36. If the electronic watermark data is not detected in the application form 1, i.e., if the application form 1 is a regular document (NO at step S302), the image processing apparatus 10 outputs a copy (step S305). If it is determined that the pressed button is not the copy/electronic watermark read button 151 but the application program start button 152 (NO at step S301), the image processing apparatus 10 starts a program not requiring the detection of the electronic watermark (step S306).

Figure 36:
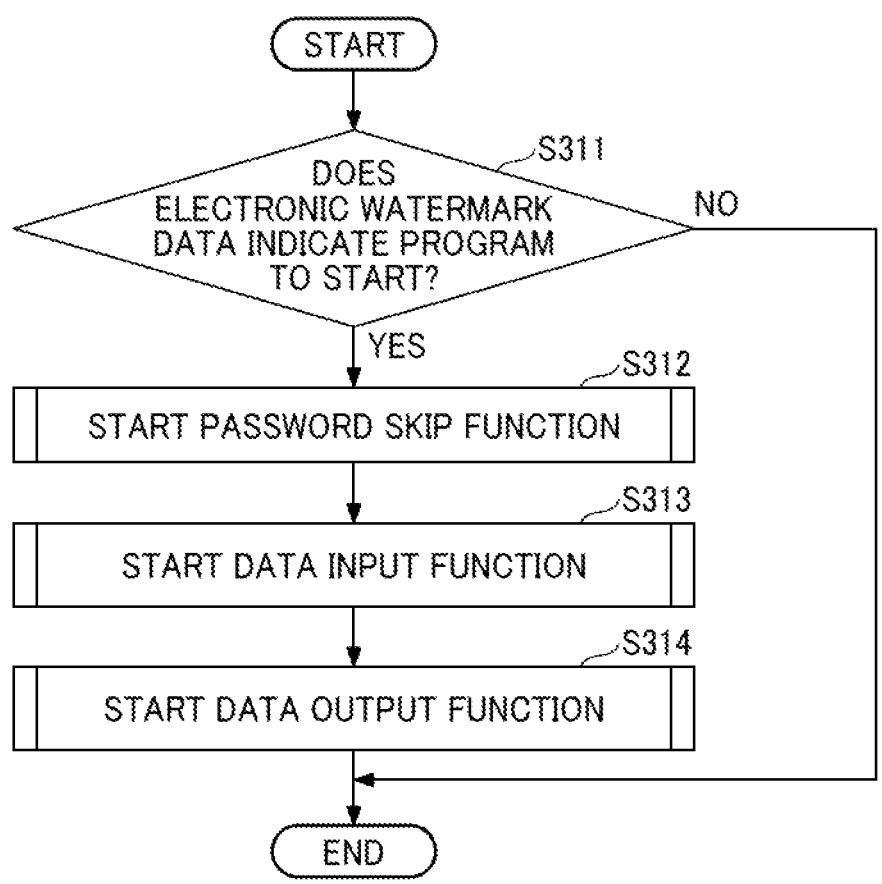
FIG. 36 is a flowchart illustrating an example of a program start process by a program start unit of the image processing apparatus of the embodiment.

FIG. 36 is a flowchart illustrating the program start process performed by the program start unit 15. The program start unit 15 determines whether the electronic watermark data indicates a program to start (step S311). If the electronic watermark data indicates a program to start (YES at step S311), the program start unit 15 starts the program, and starts a password skip function (step S312). If the electronic watermark data does not indicate a program to start (NO at step S311), the program start unit 15 completes the program start process. With the electronic watermark data, the password skip function determines whether to skip the password in the process of reading the IC card 2. Details of the process of the password skip function will be described later with FIG. 37. The program start unit 15 starts a data input function (step S313). The data input function performs a process for inputting data for the application. Details of the process of the data input function will be described later with FIG. 39. The program start unit 15 then starts a data output function (step S314). The data output function performs a process for registering the application in the application table and creating a document to be sent by mail. Details of the process of the data output function will be described later with FIG. 42.

Figure 37:
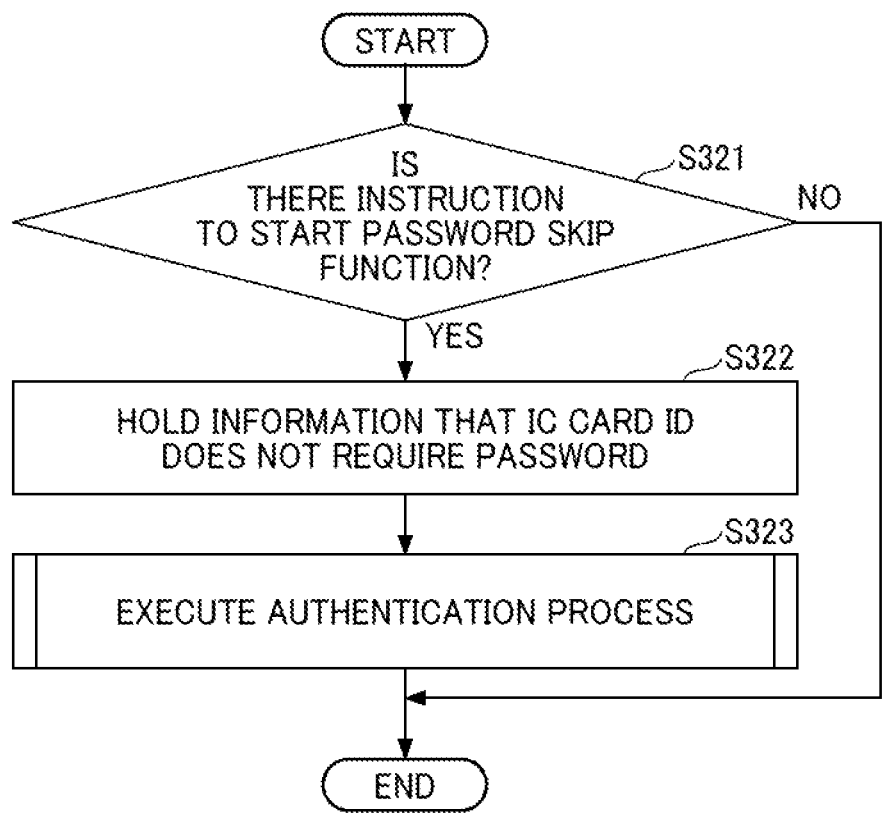
FIG. 37 is a flowchart illustrating an exemplary process of a password skip function of the image processing apparatus of the embodiment.

FIG. 37 is a flowchart illustrating the process of the password skip function. The authentication unit 18 determines whether there is an instruction to start the password skip function (step S321). When the electronic watermark data indicates a program to start (YES at step S311 in FIG. 36), the authentication unit 18 determines that there is an instruction to start the password skip function (YES at step S321). Whether to skip the password is previously set in the image processing apparatus 10. The electronic watermark data includes the application ID, and the application ID and the IC card ID are associated with each other in the IC card table of the external storage apparatus 30. The external storage apparatus 30 therefore authenticates the applicant 9 based on whether the IC card ID included in the IC card table matches the IC card ID included in the personal information table. Consequently, the password input may be skipped in the application system 100. If there is an instruction to start the password skip function (YES at step S321), the authentication unit 18 holds information that the password is skipped for the IC card ID (step S322). The authentication unit 18 then stands by until the start of the authentication process (step S323). The authentication process is illustrated in FIG. 38.

Figure 38:
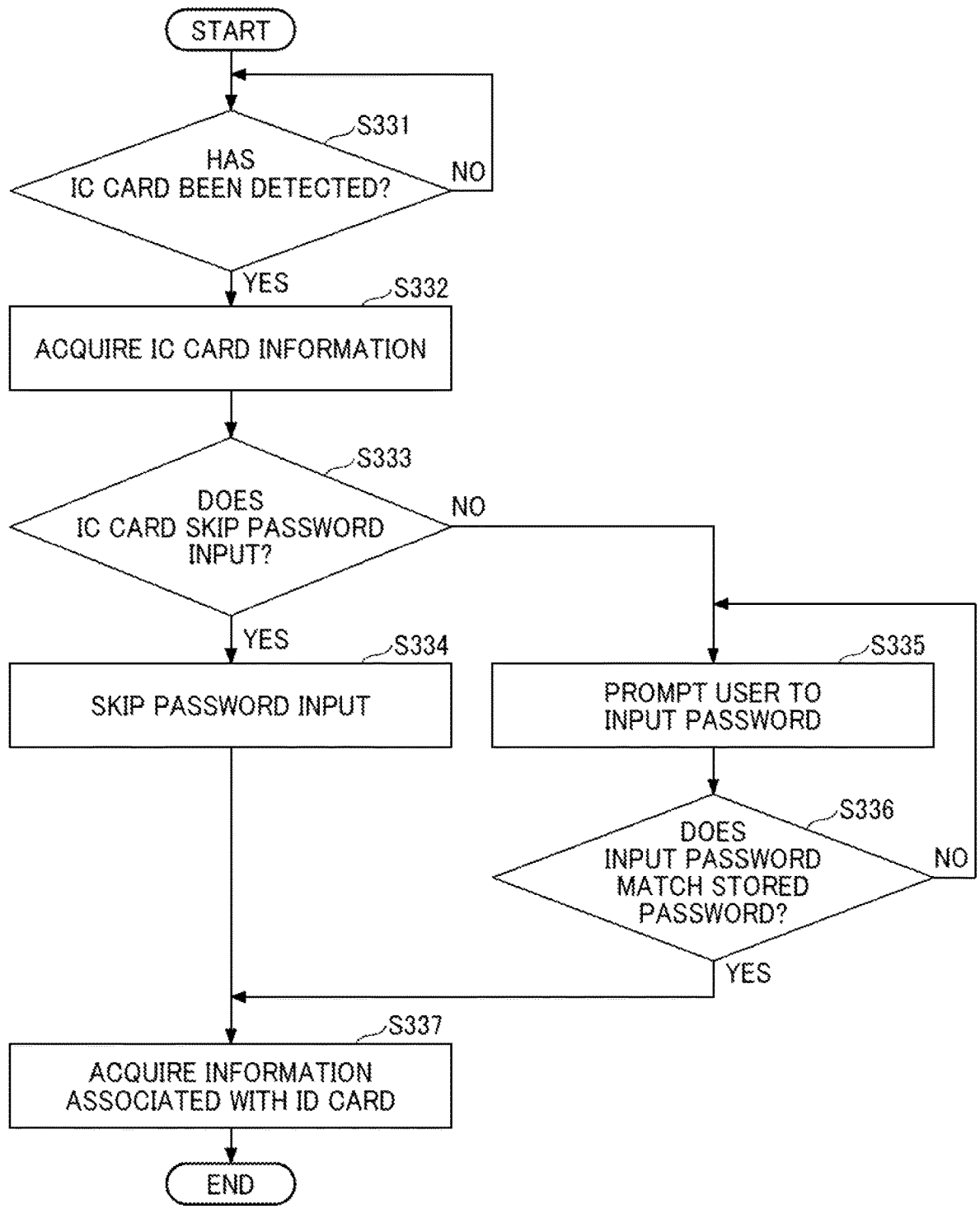
FIG. 38 is a flowchart illustrating an exemplary authentication process of the image processing apparatus of the embodiment.

FIG. 38 is a flowchart illustrating the authentication process. The IC card information acquisition unit 16 determines whether the IC card 2 has been detected (step S331). If it is determined that the IC card 2 has been detected (YES at step S331), the IC card information acquisition unit 16 acquires the IC card information from the IC card 2 (step S332). The authentication unit 18 then determines whether the information that the password is skipped for the IC card ID is held (step S333). If the skip of the password input is allowed (YES at step S333), the authentication unit 18 skips the password input (step S334). If the skip of the password input is not allowed (NO at step S333), the authentication unit 18 repeats a process of prompting the user to input the password (step S335) until the input password matches the password stored in the IC card 2 (YES at step S336). Following the skip of the password input (step S334) or the match between the input password and the stored password (YES at step S336), the authentication unit 18 acquires the information associated with the IC card ID from the external storage apparatus 30 or the image processing apparatus 10 (step S337). With the above-described authentication process, the identity verification with the IC card 2 is enabled.

Figure 39:
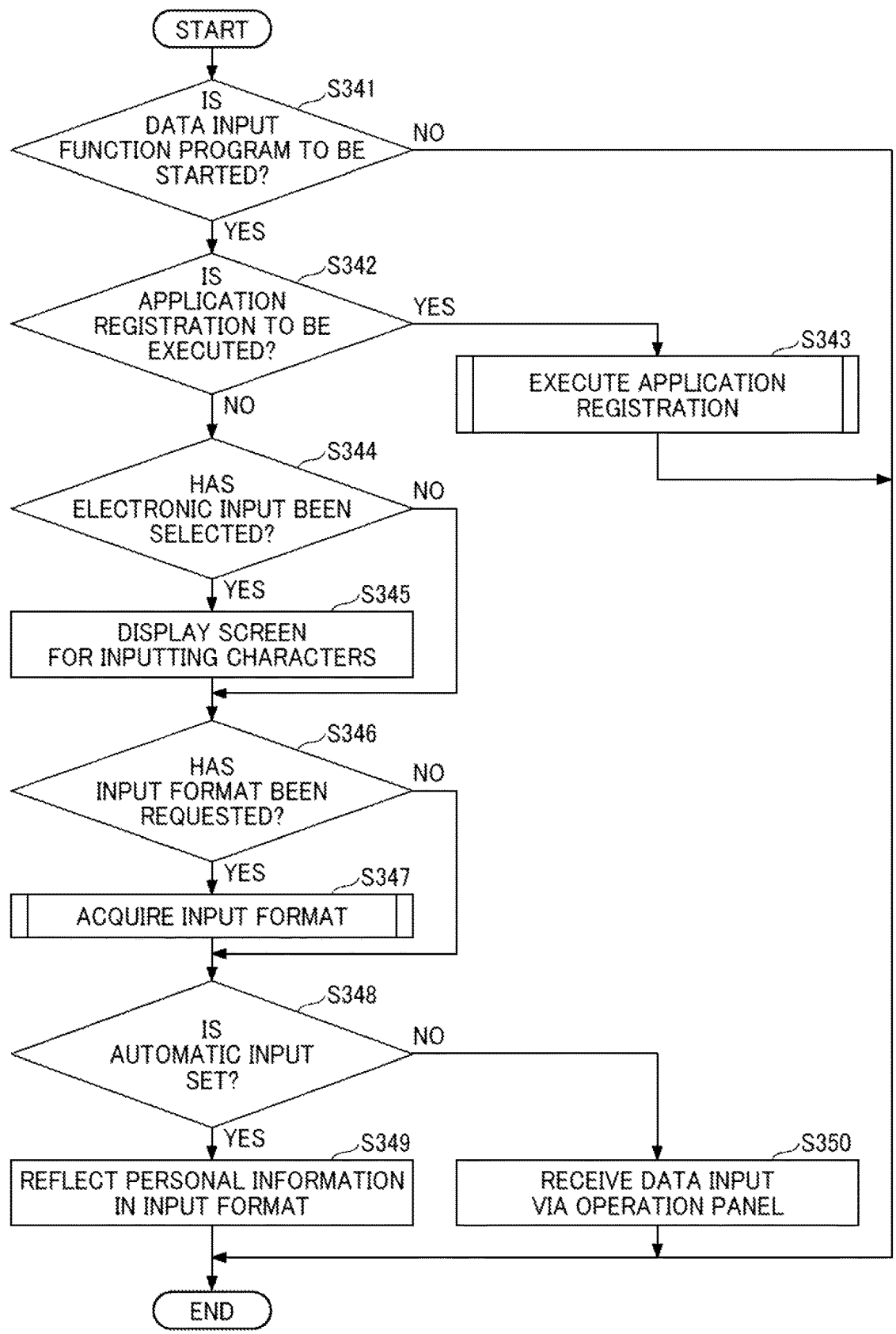
FIG. 39 is a flowchart illustrating an exemplary process of a data input function of the image processing apparatus of the embodiment.

FIG. 39 is a flowchart illustrating the process of the data input function. Herein, data input refers to the input of the personal information to the application form 1. The program start unit 15 determines whether to start a data input function program (step S341). With step S313 in FIG. 36, the program start unit 15 determines to start the data input function program (YES at step S341). When starting the data input function program, the program start unit 15 determines whether to execute the application registration based on the image data of the application form 1 (step S342). The applicant 9 is allowed to fill out the application form 1 by hand. At step S342, whether to execute the application registration is specified by the applicant 9 on the image processing apparatus 10. If the program start unit 15 determines to execute the application registration (YES at step S342), the image processing apparatus 10 executes the application registration with the read image data (step S343). Details of the application registration process will be described later with FIG. 40.

If the program start unit 15 determines not to execute the application registration (NO at step S342), the operation receiving unit 19 determines whether the applicant 9 has selected electronic input via the operation panel 940 (step S344). If it is determined that the applicant 9 has selected the electronic input (YES at step S344), the operation receiving unit 19 displays a screen for inputting characters on the operation panel 940 (step S345). The operation receiving unit 19 then determines whether the applicant 9 has requested the input format (step S346). If it is determined that the applicant 9 has requested the input format (YES at step S346), the format display unit 14 acquires the input format based on the format ID included in the electronic watermark data (step S347). Details of the input format acquisition process will be described later with FIG. 41.

The format display unit 14 then determines whether the image processing apparatus 10 is set to automatically input the personal information (step S348). If it is determined that the image processing apparatus 10 is set to automatically input the personal information (YES at step S348), the format display unit 14 acquires the personal information associated with the IC card ID from the personal information table, and reflects the acquired personal information in the input format (step S349). If it is determined that the image processing apparatus 10 is not set to automatically input the personal information (NO at step S348), the applicant 9 inputs data for the application via the operation panel 940, and the operation receiving unit 19 receives the input data (step S350).

Figure 40:
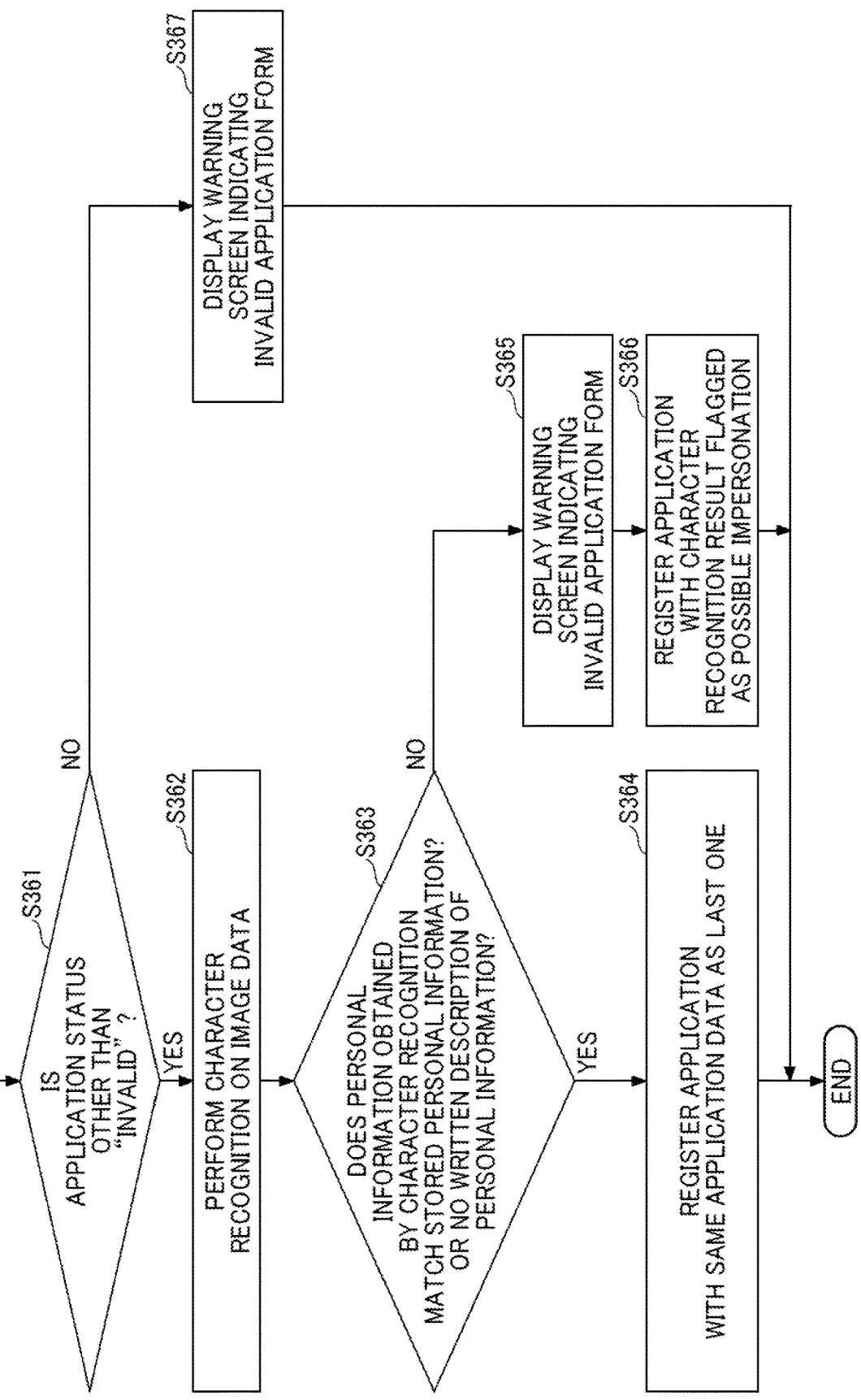
FIG. 40 is a flowchart illustrating an exemplary application registration process of the image processing apparatus of the embodiment.

FIG. 40 is a flowchart illustrating the application registration process. The communication unit 11 of the image processing apparatus 10 transmits the application ID included in the electronic watermark data to the external storage apparatus 30, and determines whether a notification that the application status associated with the application ID is not "invalid" has been received from the external storage apparatus 30 (step S361).

If the receipt of the notification is determined (YES at step S361), the character recognition unit 20 performs the character recognition on the image data of the application form 1 (step S362). The identity verification unit 17 then determines whether the personal information obtained through the character recognition matches the personal information associated with the application ID of the electronic watermark data in the personal information table, i.e., whether the application ID, the IC card ID, and the personal information match (step S363). In the present example, the identity verification is executed not by the external storage apparatus 30 but by the image processing apparatus 10. Further, the document creation unit 24 determines whether there is no written description of the personal information.

If the match between the two types of personal information or no written description of the personal information is determined (YES at step S363), the application data registration unit 25 registers the application with the same application data as the last one (step S364). If the non-match between the two types of personal information or a change or addition to the personal information is determined (NO at step S363), the document creation unit 24 displays a warning screen indicating that the application form 1 is invalid (step S365). The application data registration unit 25 then registers the application with the application data based on the result of the character recognition, and sets a flag on the application to indicate possible impersonation (step S366). If there is no receipt of the notification that the application status associated with the application ID is not "invalid" (NO at step S361), the document creation unit 24 displays the warning screen indicating that the application form 1 is invalid (step S367).

Figure 41:
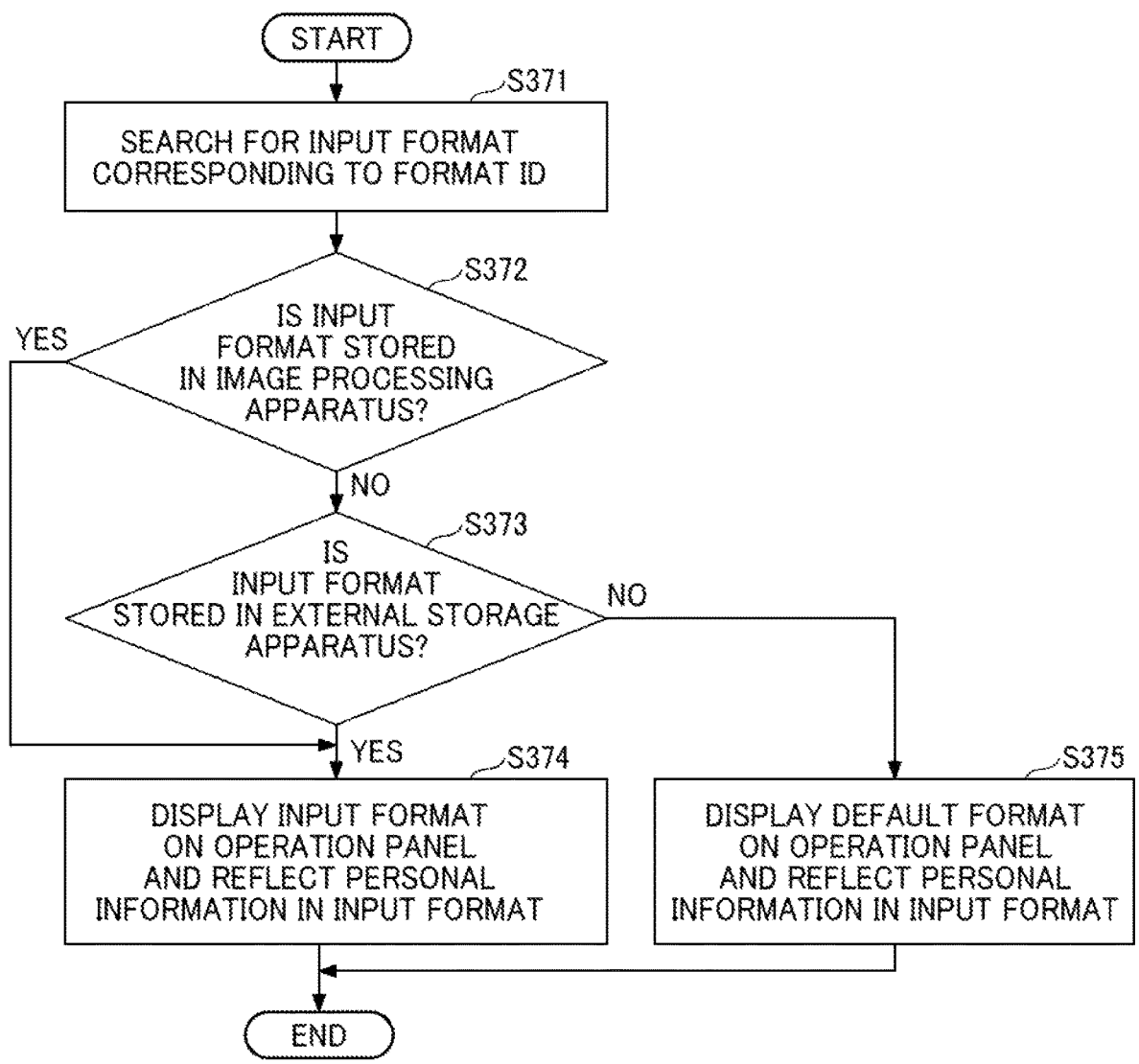
FIG. 41 is a flowchart illustrating an example of an input format acquisition process included in the application registration process of FIG. 39.

FIG. 41 is a flowchart illustrating the input format acquisition process of step S347 in FIG. 39. The format display unit 14 searches through the format table for the input format corresponding to the format ID included in the electronic watermark data (step S371). If the input format is not stored in the image processing apparatus 10 (NO at step S372), the format display unit 14 searches through the external storage apparatus 30 for the input format (step S373). If the input format is retrieved (YES at step S372 or S373), the format display unit 14 displays the input format on the operation panel 940 based on the data structure of the input format (step S374). The format display unit 14 further performs a process of reflecting the personal information acquired from the personal information table in the input format. If the input format is absent (NO at step S373), the format display unit 14 displays, on the operation panel 940, the family name field and the given name field as a default format used in the absence of the input format based on the initial settings (step S375). The format display unit 14 further performs a process of reflecting the personal information input by the applicant 9 in the input format.

FIG. 42 is a flowchart illustrating the data output process. The print unit 23 determines whether an instruction to start the data output process has been issued (step S381). With step S314 in FIG. 36, it is determined that the instruction to start the data output process has been issued (YES at step S381). The print unit 23 then determines whether the application form 1 is to be output for submission in person to the local government (step S382). If it is determined that the application form 1 for submission in person is not to be output (NO at step S382), the print unit 23 determines whether the application registration is to be submitted through data communication (step S383). If it is determined that the application registration is not to be submitted through data communication (NO at step S383), the print unit 23 determines whether the application registration is to be submitted by mail (step S384).

If it is determined that the application registration is to be submitted by mail (YES at step S384), the print unit 23 prints the application form 1 for submission by mail (step S385). Further, the invalidation request unit 21 requests the external storage apparatus 30 to invalidate the application ID, and the application ID request unit 22 acquires a new application ID from the external storage apparatus 30. The new application ID is embedded in the electronic watermark of the application form 1 for submission by mail. If it is determined that the application form 1 for submission in person is to be output (YES at step S382), the print unit 23 prints the application form 1 for submission in person (step S386). If it is determined that the application registration is to be submitted through data communication (YES at step S383), the application data registration unit 25 transmits the application data created by the document creation unit 24 to the external storage apparatus 30 via the communication unit 11 (step S387).

As described above, the application system 100 of the present embodiment saves the applicant 9 from filling out the application form 1 by hand with the same information in accordance with the same format in each application while checking the content of the application form 1. Further, even if the application form 1 falls into the hands of a third party, the application system 100 prevents impersonation by the third party changing the address of the application form 1.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

For instance, in the foregoing embodiment, the description has been given of the application with the application form as an example. The application system 100, however, is also applicable to the application with another type of document, for example. Further, the party that receives the application is not limited to the local government, and may be any other organization such as a company.

In the configuration examples illustrated in FIG. 9 and other drawings, the processing units of the image processing apparatus 10 and the external storage apparatus 30 are divided in accordance with major functions of the image processing apparatus 10 and the external storage apparatus 30 to facilitate the understanding of the processing of the image processing apparatus 10 and the external storage apparatus 30. The invention of the present application is not limited by how the processing units are divided or the names of the processing units. The processing of the image processing apparatus 10 and the external storage apparatus 30 may be divided into a larger number of processing units in accordance with the processing. Further, any one of the processing units may be subdivided to include more processes.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The apparatuses described in the embodiment disclosed in the present specification form one of a plurality of computing environments for implementing the embodiment. In an embodiment of the present invention, the external storage apparatus 30 is a server cluster including a plurality of computing devices configured to communicate with each other via a desired type of communication link such as a network or a shared memory, for example, to execute the processes disclosed in the present specification.

Further, the external storage apparatus 30 may be configured to share the disclosed processing steps, such as those illustrated in FIGS. 29, 31, and 33, for example, in various combinations. For instance, a process executed by a particular unit may be executed by a plurality of information processing apparatuses included in the external storage apparatus 30. Further, the components of the external storage apparatus 30 may be integrated in a single server, or may be distributed to a plurality of apparatuses.

The invention claimed is:

1. An information processing system comprising:
an image processing apparatus including first circuitry configured to
read an application form with a scanner to generate image data,
acquire electronic watermark data from the image data,
acquire, from an integrated circuit card, first identification information of the integrated circuit card, and
create application data based on the application form; and
an information processing apparatus including second circuitry configured to communicate with the image processing apparatus via a network, and
perform user authentication based on the first identification information of the integrated circuit card acquired from the integrated circuit card and second identification information of the integrated circuit card previously associated with identification information of the application form,
the first circuitry of the image processing apparatus stopping creating the application data when the user authentication fails.

2. The information processing system of claim 1, wherein the electronic watermark data includes the identification information of the application form,
wherein the first circuitry of the image processing apparatus transmits the identification information of the application form and the first identification information of the integrated circuit card to the information processing apparatus,
wherein the second circuitry of the information processing apparatus
in response to receipt of the identification information of the application form and the first identification information of the integrated circuit card, performs the user authentication based on the received first identification information of the integrated circuit card and the second identification information of the integrated circuit card previously associated with the identification information of the application form, and
transmits a result of the user authentication to the image processing apparatus, and wherein the first circuitry of the image processing apparatus stops creating the application data when the result of the user authentication indicates failed user authentication.

3. The information processing system of claim 2, wherein the first circuitry of the image processing apparatus
before acquiring the first identification information of the integrated circuit card, transmits a password input to the image processing apparatus and the first identification information of the integrated circuit card to the information processing apparatus,
receives, from the information processing apparatus, a result of authentication performed based on the password and the first identification information of the integrated circuit card, and
based on a setting of the image processing apparatus to skip the password, determines successful authentication with the integrated circuit card, skipping the input of the password.

4. The information processing system of claim 2, wherein the second circuitry of the information processing apparatus
stores the identification information of the application form in association with an application status of the application form, the application status of the application form being invalidated by each print of the application form, and
transmits, to the image processing apparatus, an application status corresponding to the identification information of the application form received from the image processing apparatus, and
wherein when the application status corresponding to the identification information of the application form is other than invalid, the first circuitry of the image processing apparatus accepts an instruction to create the application data.

5. The information processing system of claim 4, wherein the image processing apparatus includes a printer configured to print the application data on a sheet based on the application form, and
wherein with specification of the identification information of the application form included in the electronic watermark data, the first circuitry of the image processing apparatus requests the information processing apparatus to change the application status of the application form to invalid.

6. The information processing system of claim 5, wherein in addition to the request to change the application status of the application form to invalid, the first circuitry of the image processing apparatus requests the information processing apparatus to issue new identification information of the application form, and
wherein the printer prints, on the sheet, an electronic watermark containing the new identification information of the application form.

7. The information processing system of claim 2, wherein the electronic watermark data includes identification information of a format of the application form, and
wherein with reference to a memory that stores the identification information of the format of the application form and format information in association with each other, the first circuitry of the image processing apparatus causes a display to display input items of the application form based on the format information associated with the identification information of the format of the application form included in the electronic watermark data.

8. The information processing system of claim 2, wherein the electronic watermark data includes identification information of a program, and
wherein with reference to a memory that stores the program and the identification information of the program in association with each other, the first circuitry of the image processing apparatus starts the program associated with the identification information of the program included in the electronic watermark data.

9. The information processing system of claim 5, wherein the first circuitry of the image processing apparatus reads the sheet on which the application data is printed by the printer, and transmits the identification information of the application form included in the electronic watermark data to the information processing apparatus,
wherein the second circuitry of the information processing apparatus transmits, to the image processing apparatus, the application status corresponding to the identification information of the application form transmitted from the image processing apparatus, and
wherein the first circuitry of the image processing apparatus accepts the sheet when the application status corresponding to the identification information of the application form is unreceived.

10. The information processing system of claim 9, wherein the first circuitry of the image processing apparatus
performs character recognition on the application data on the sheet, and
transmits, to the information processing apparatus, first personal information obtained through the character recognition and the identification information of the application form included in the electronic watermark data on the sheet, and
wherein the second circuitry of the information processing apparatus
identifies the second identification information of the integrated circuit card associated with the identification information of the application form,
acquires second personal information associated with the second identification information of the integrated circuit card,
determines whether the first personal information and the second personal information match, and
transmits a result of the determination to the image processing apparatus.

11. The information processing system of claim 10, wherein when the result of the determination indicates failed match between the first personal information and the second personal information, the first circuitry of the image processing apparatus stores the application data with information indicating that the first personal information involves possible impersonation.

12. An information processing method comprising:
reading an application form with a scanner to generate image data;
acquiring electronic watermark data from the image data;
acquiring, from an integrated circuit card, first identification information of the integrated circuit card;
creating application data based on the application form;
performing user authentication based on the acquired first identification information of the integrated circuit card and second identification information of the integrated circuit card previously associated with identification information of the application form; and
stopping creating the application data when the user authentication fails.

13. An information processing apparatus comprising circuitry configured to
receive first identification information of an integrated circuit card;
receive identification information of an application form from an image processing apparatus that creates application data based on the application form via a network, the identification information of the application form being included in electronic watermark data of image data read from the application form,
perform user authentication based on the received first identification information of the integrated circuit card and second identification information of the integrated circuit card, the second identification information of the integrated circuit card being previously associated with the identification information of the application form, and
transmit a result of the user authentication to the image processing apparatus to cause the image processing apparatus to stop creating the application data when the result of the user authentication indicates failed user authentication.

* * * * *